United States Patent [19]

Duncanson et al.

[11] Patent Number: 5,058,133
[45] Date of Patent: Oct. 15, 1991

[54] METHOD AND APPARATUS FOR DIGITAL COMMUNICATION

[75] Inventors: Jay P. Duncanson, San Francisco; Stephen J. Speckenbach, Oakland, both of Calif.

[73] Assignee: Ascend Communications, Inc., San Francisco, Calif.

[21] Appl. No.: 566,221

[22] Filed: Aug. 10, 1990

[51] Int. Cl.⁵ .............................. H04L 29/04
[52] U.S. Cl. ..................... 375/38; 370/118; 375/118; 371/1
[58] Field of Search .......... 370/37, 112, 118; 375/36, 38, 106, 118, 119; 455/59; 380/33; 371/1

[56] References Cited

U.S. PATENT DOCUMENTS

| | | | |
|---|---|---|---|
| 4,383,316 | 5/1983 | Seidel | 370/118 |
| 4,630,286 | 12/1986 | Betts | 375/38 |
| 4,734,920 | 3/1988 | Betts | 375/38 |
| 4,775,987 | 10/1988 | Miller | 375/38 |
| 4,805,167 | 2/1989 | Leslie et al. | 370/84 |
| 4,862,456 | 8/1989 | Giorgio | 375/38 |
| 4,980,897 | 12/1990 | Decker et al. | 375/38 |

Primary Examiner—Benedict V. Safourek
Attorney, Agent, or Firm—Limbach, Limbach & Sutton

[57] ABSTRACT

An apparatus and a method for use in a digital communication session is disclosed. The apparatus communicates with a like apparatus at a remote location through a digital communication network over a plurality of channels. The apparatus can change dynamically the bandwidth of the communication session by changing the number of channels utilized during the communication session. In addition, the apparatus provides a novel phase correction circuitry for reordering the digital data received from the plurality of channels to reconstitute the single transmitting digital data stream.

7 Claims, 50 Drawing Sheets

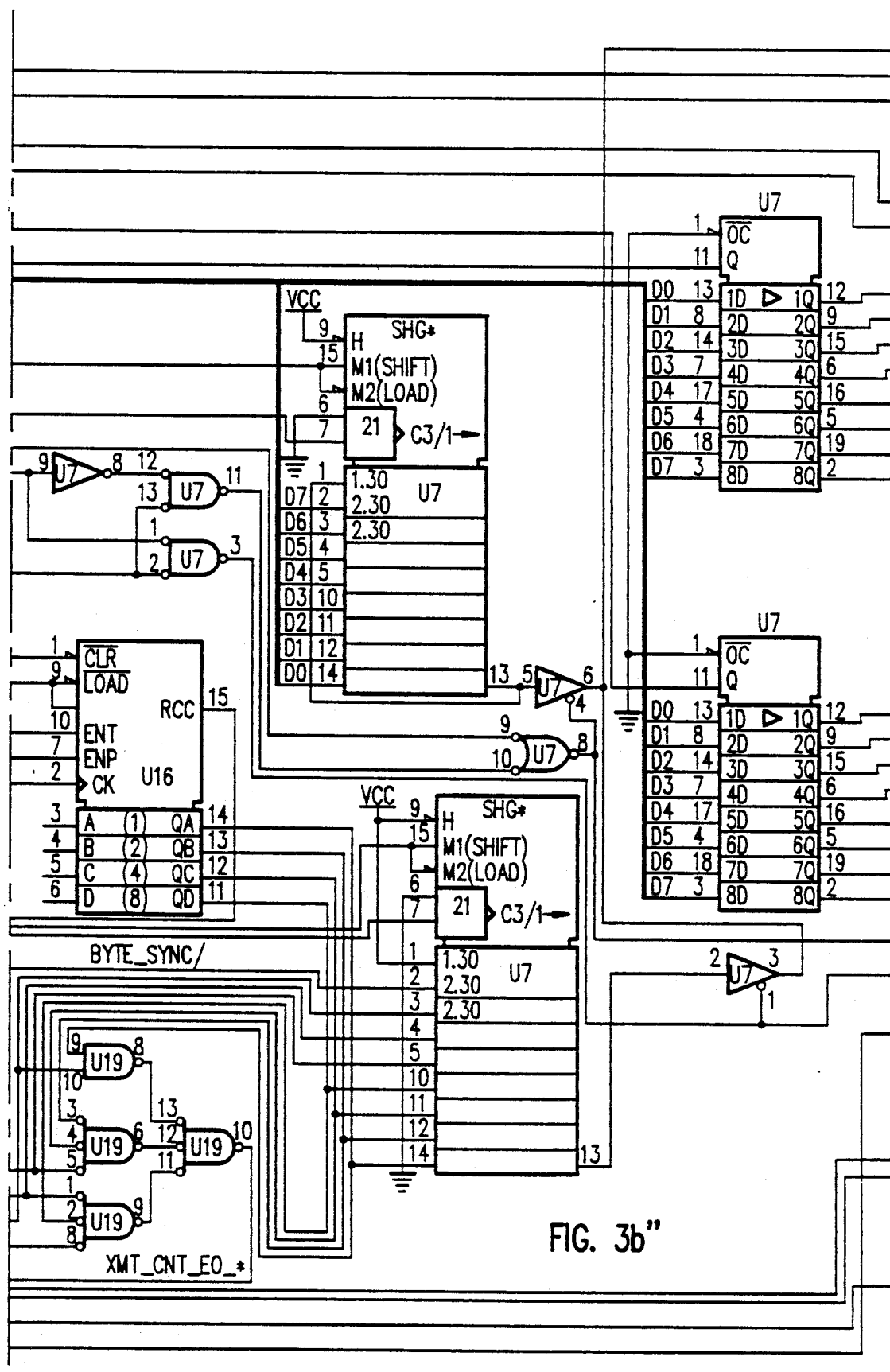
FIG. 3b"

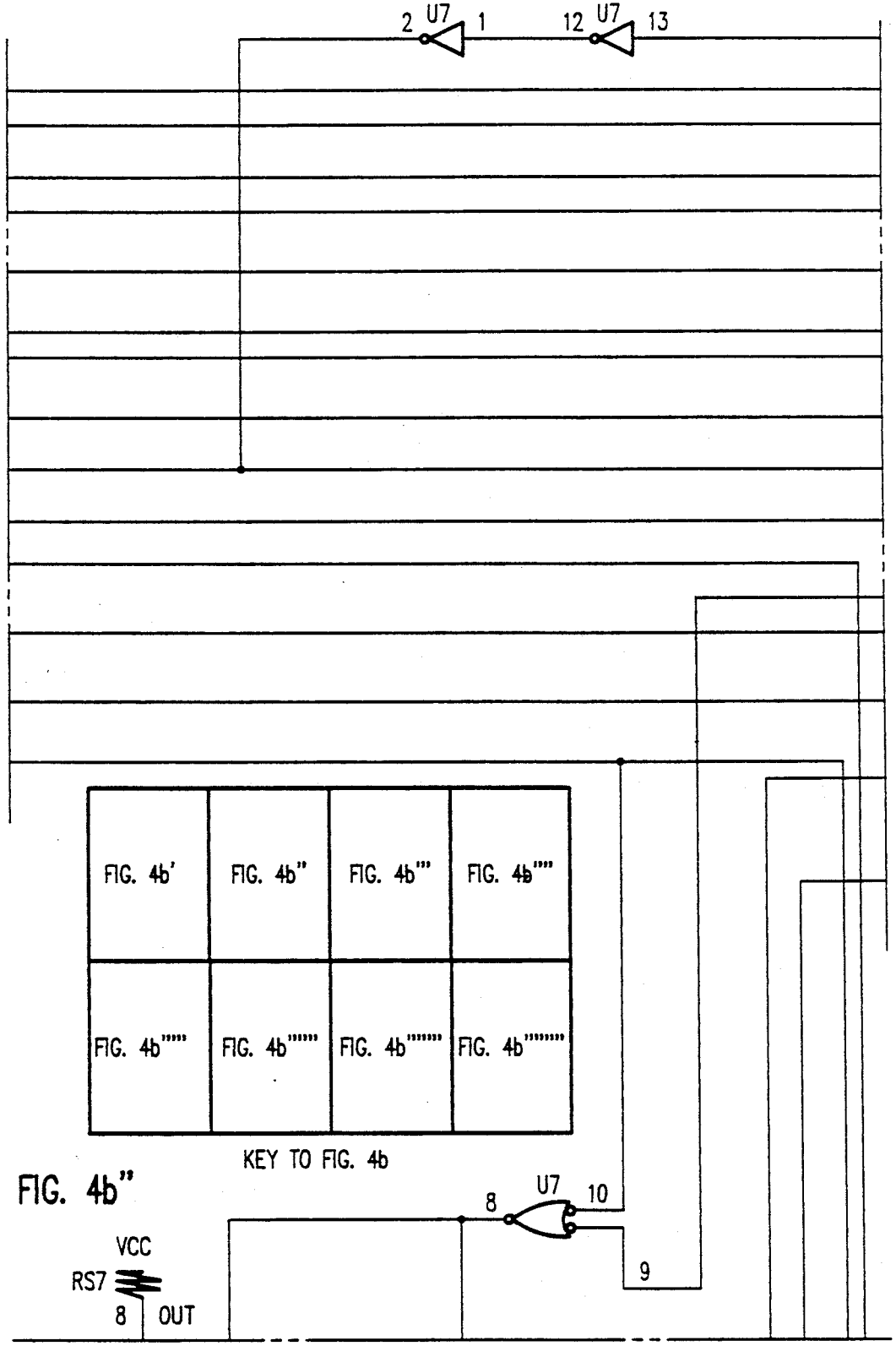

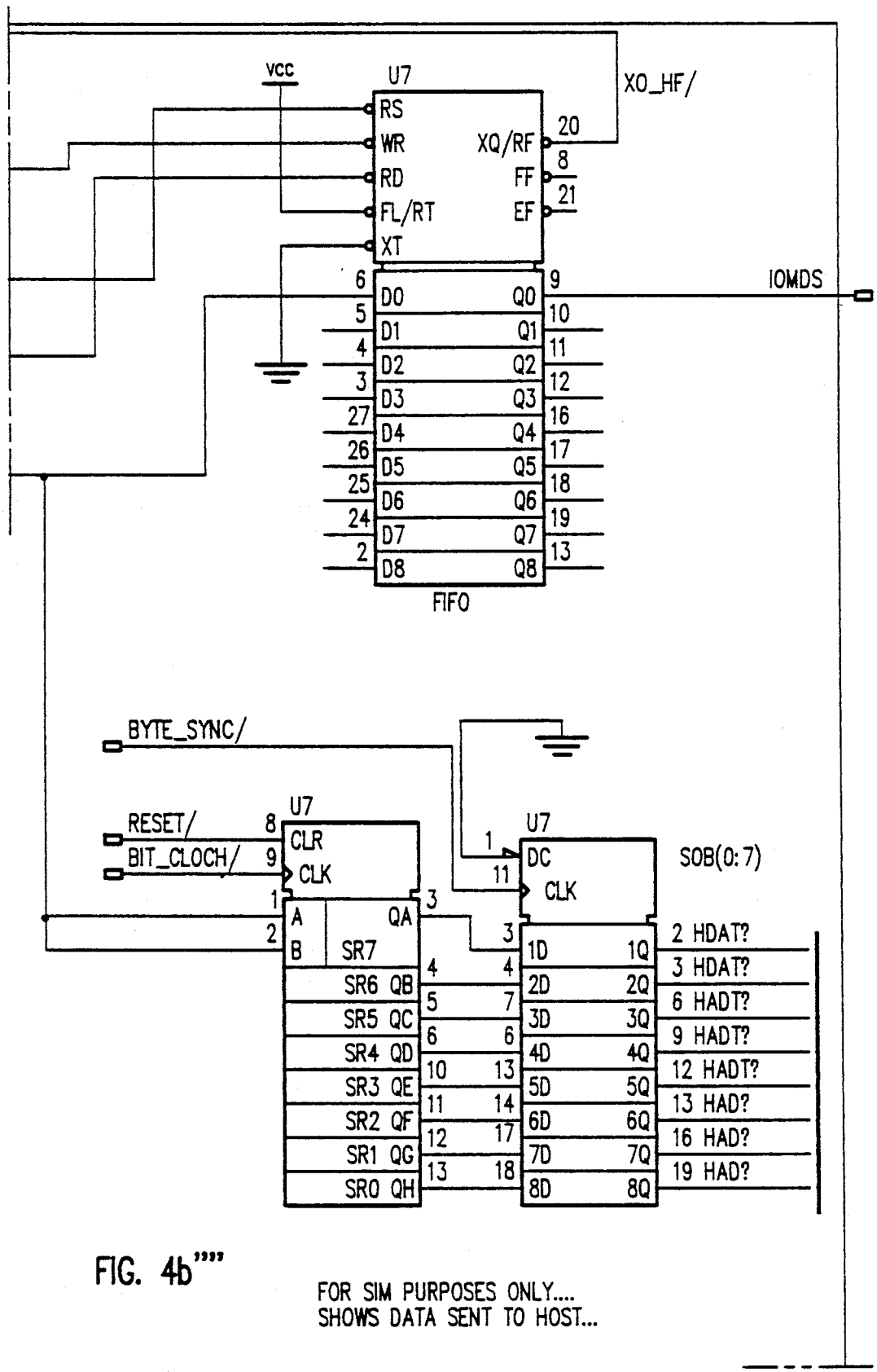
FIG. 4b""
FOR SIM PURPOSES ONLY....
SHOWS DATA SENT TO HOST...

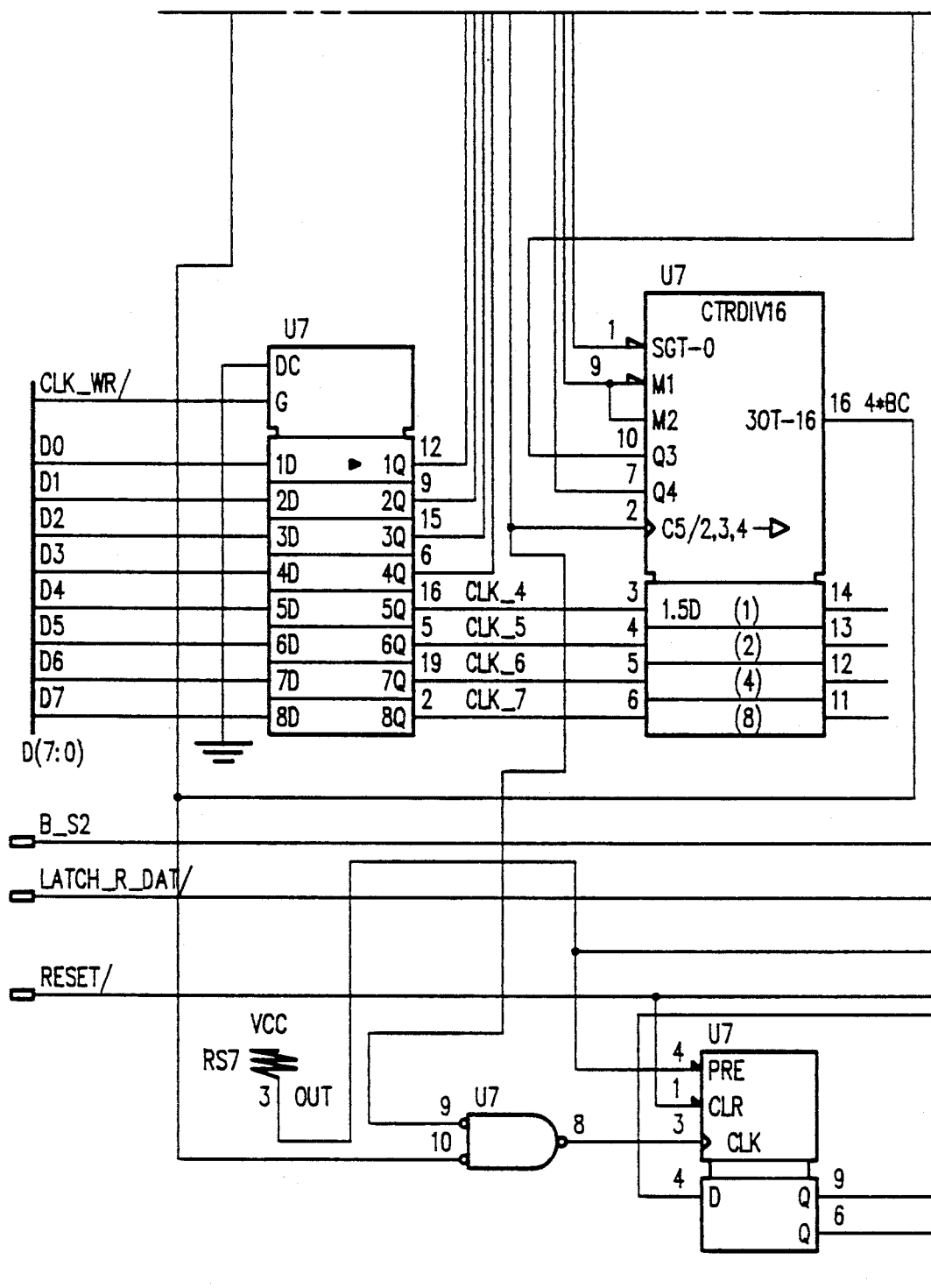
FIG. 4b'''''

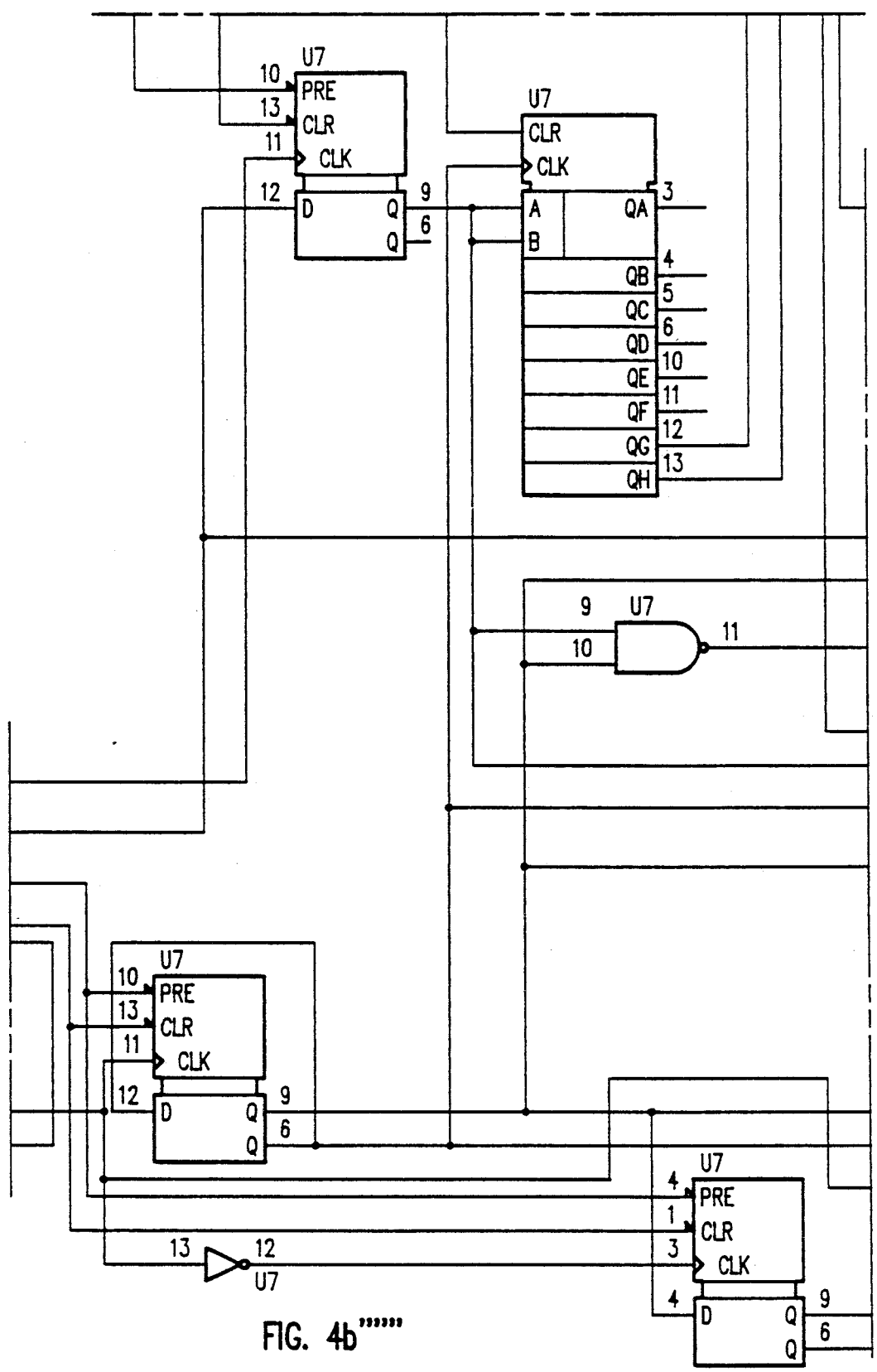
FIG. 4b'''''

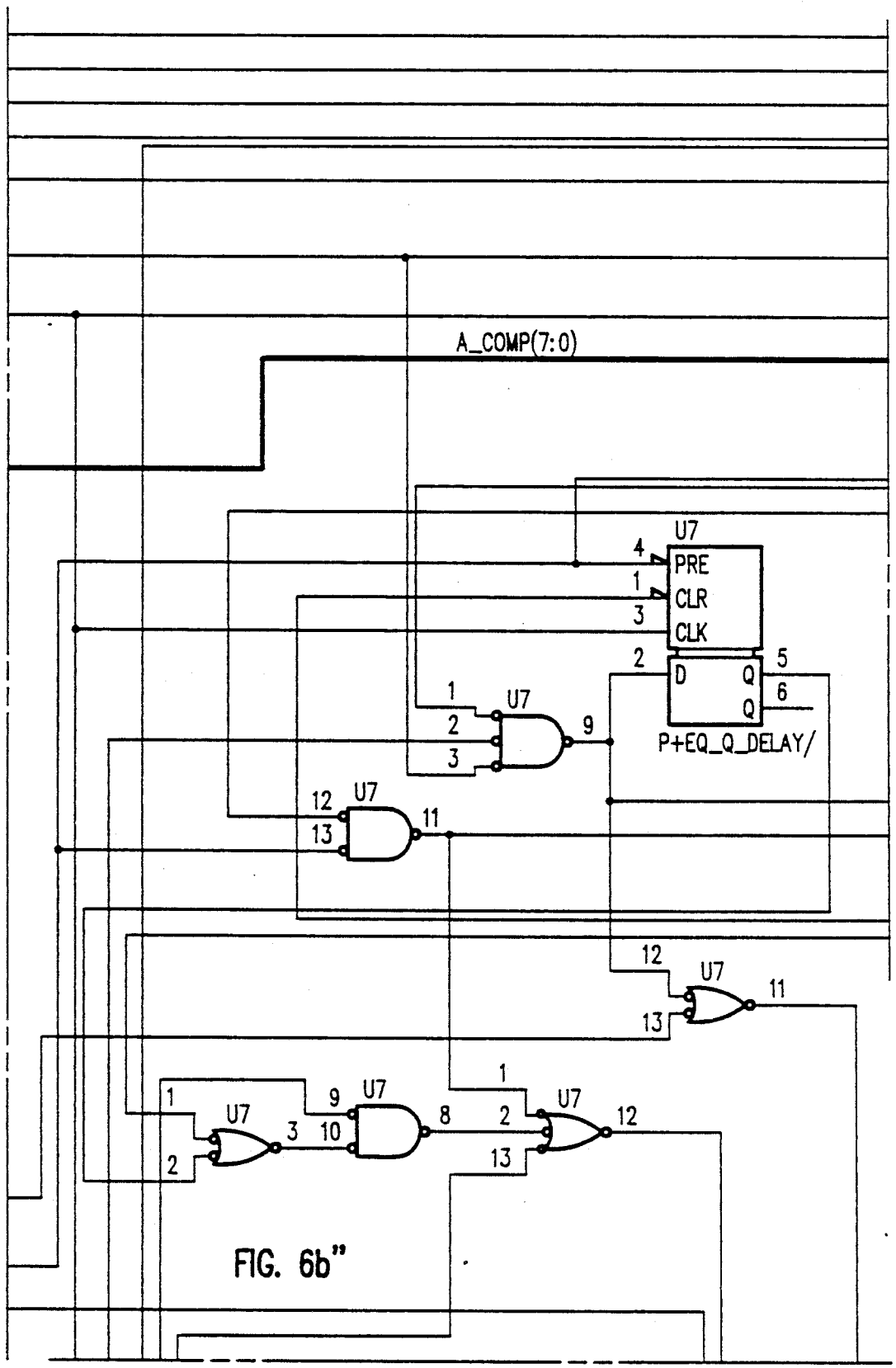
FIG. 6b"

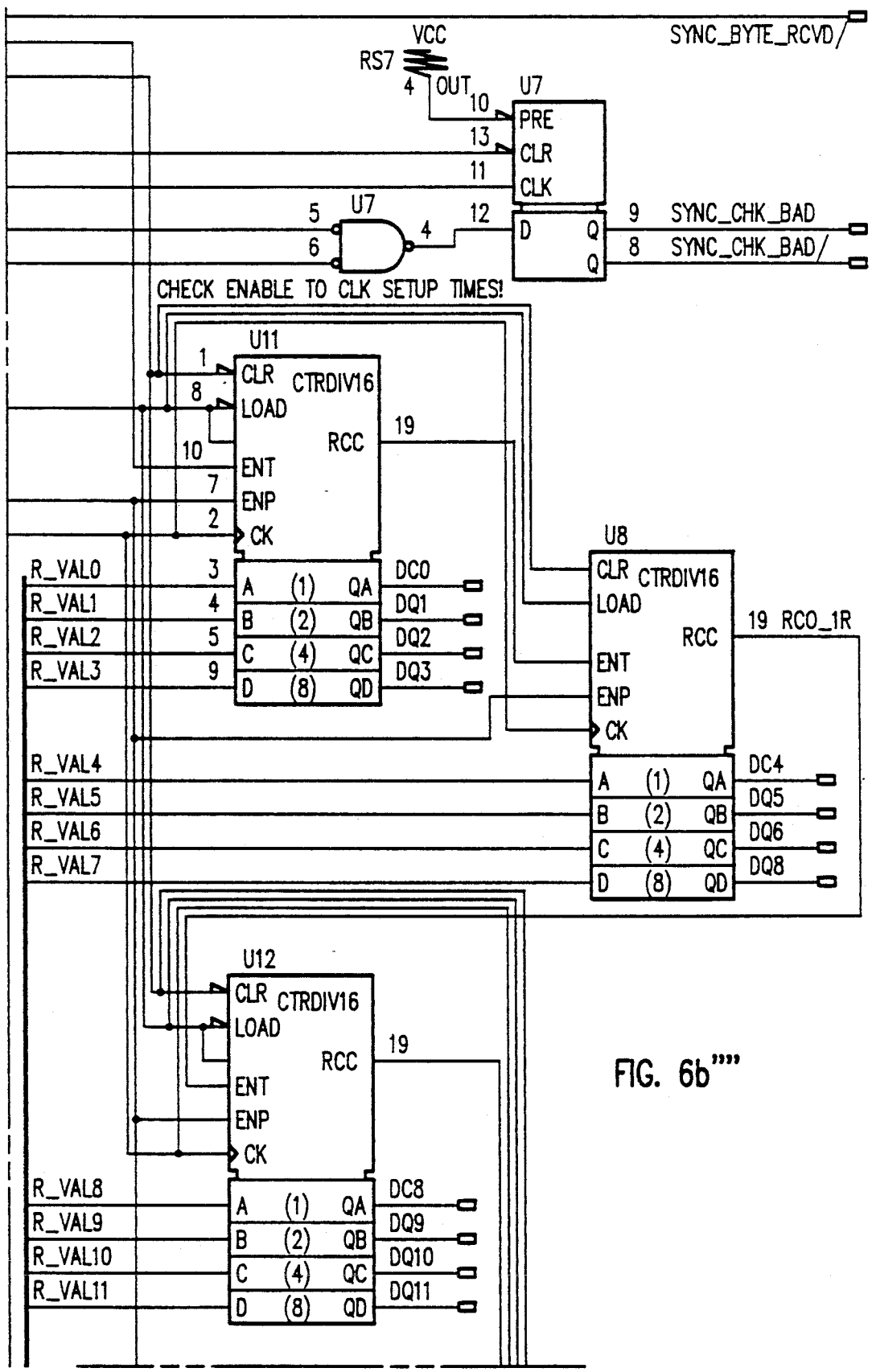
FIG. 6b''''

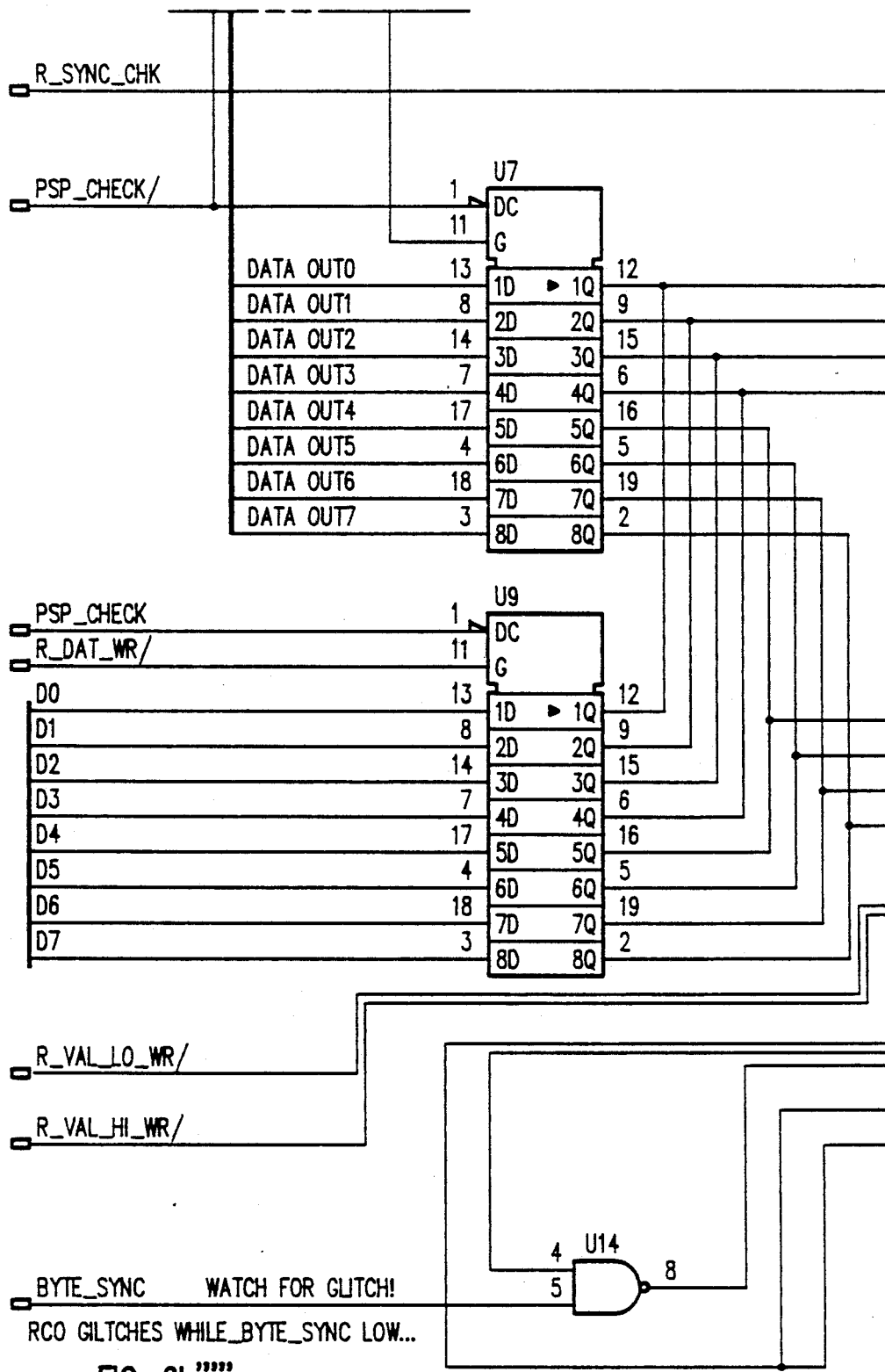
FIG. 6b'''''

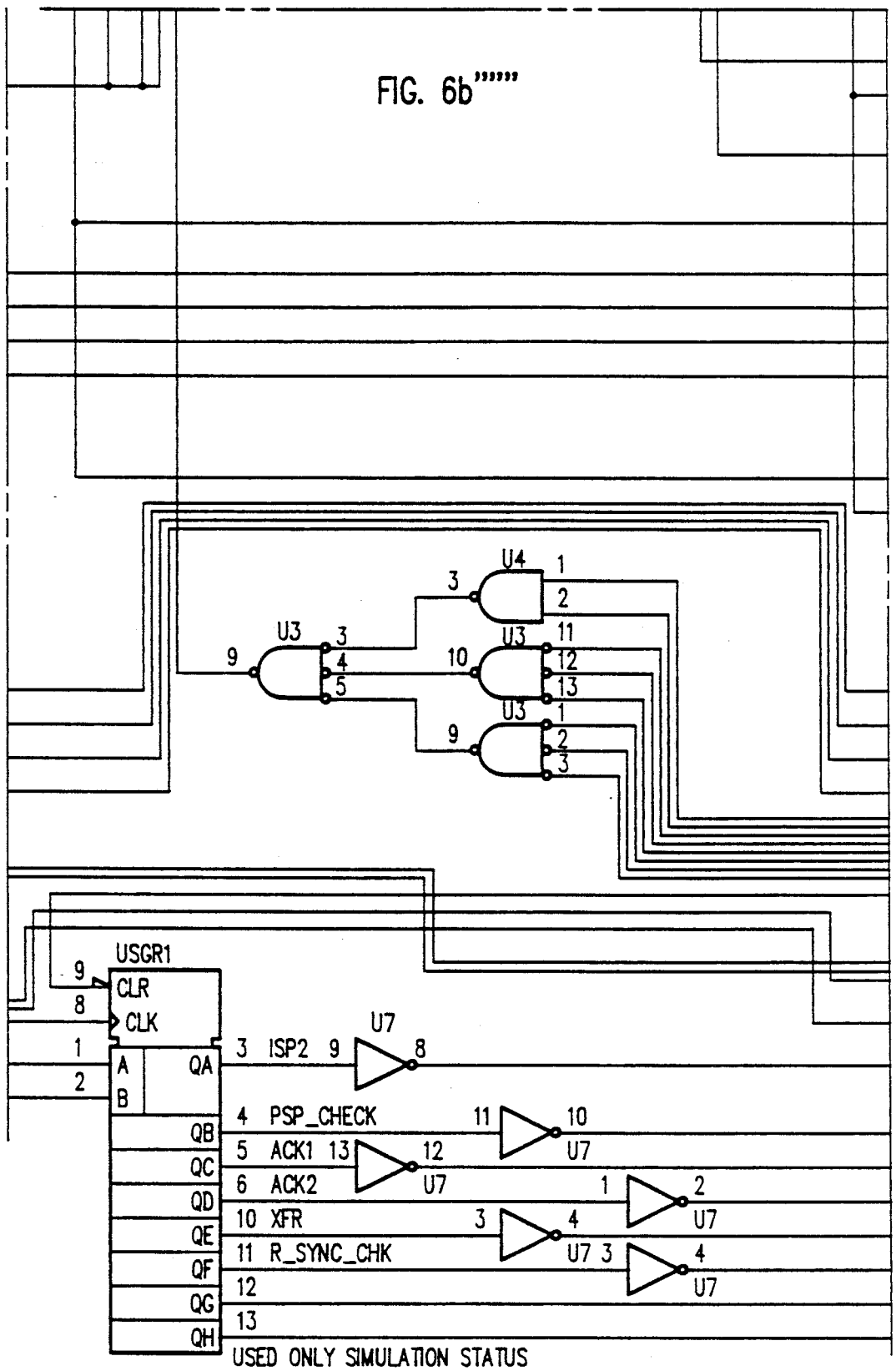

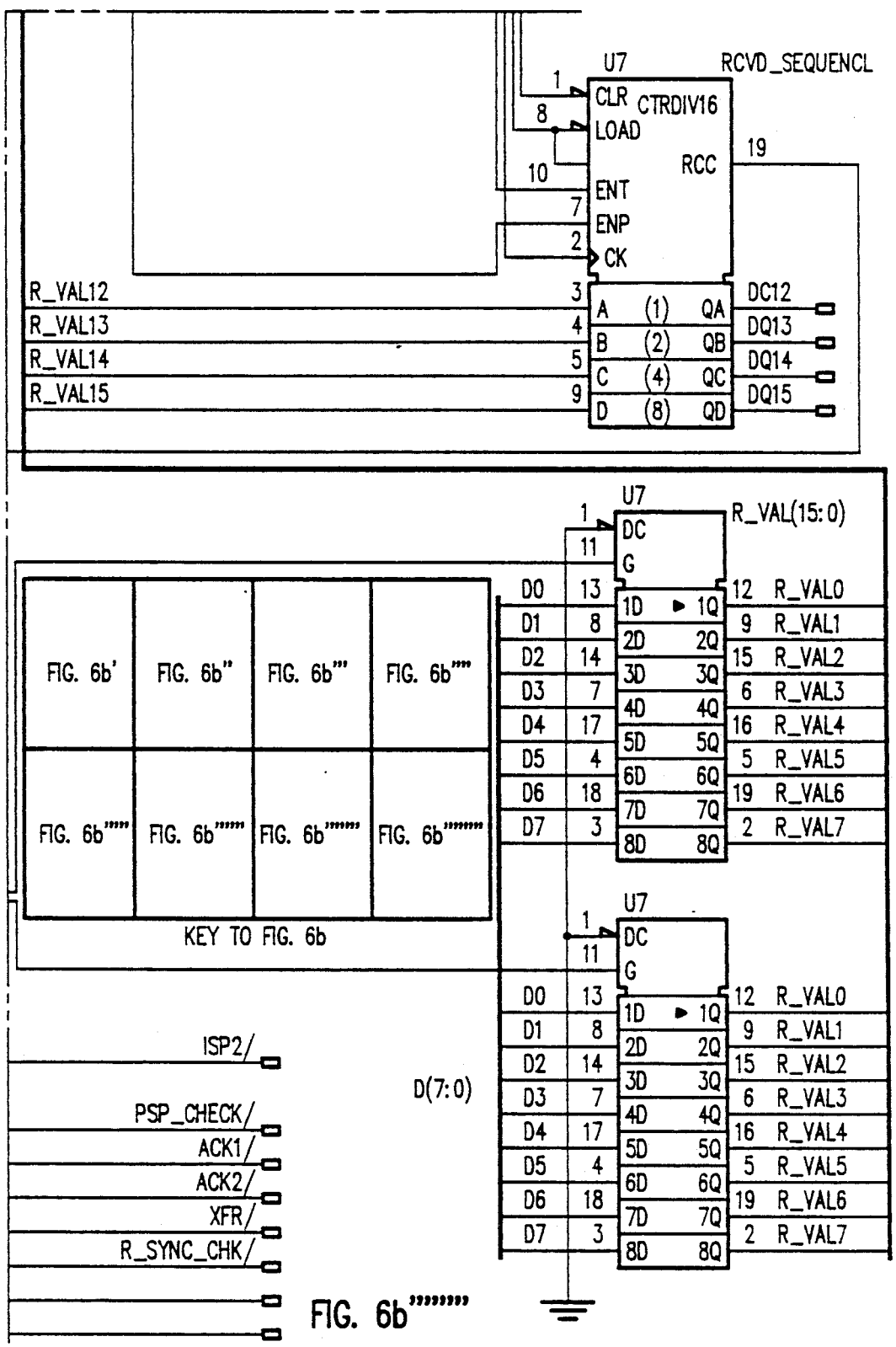

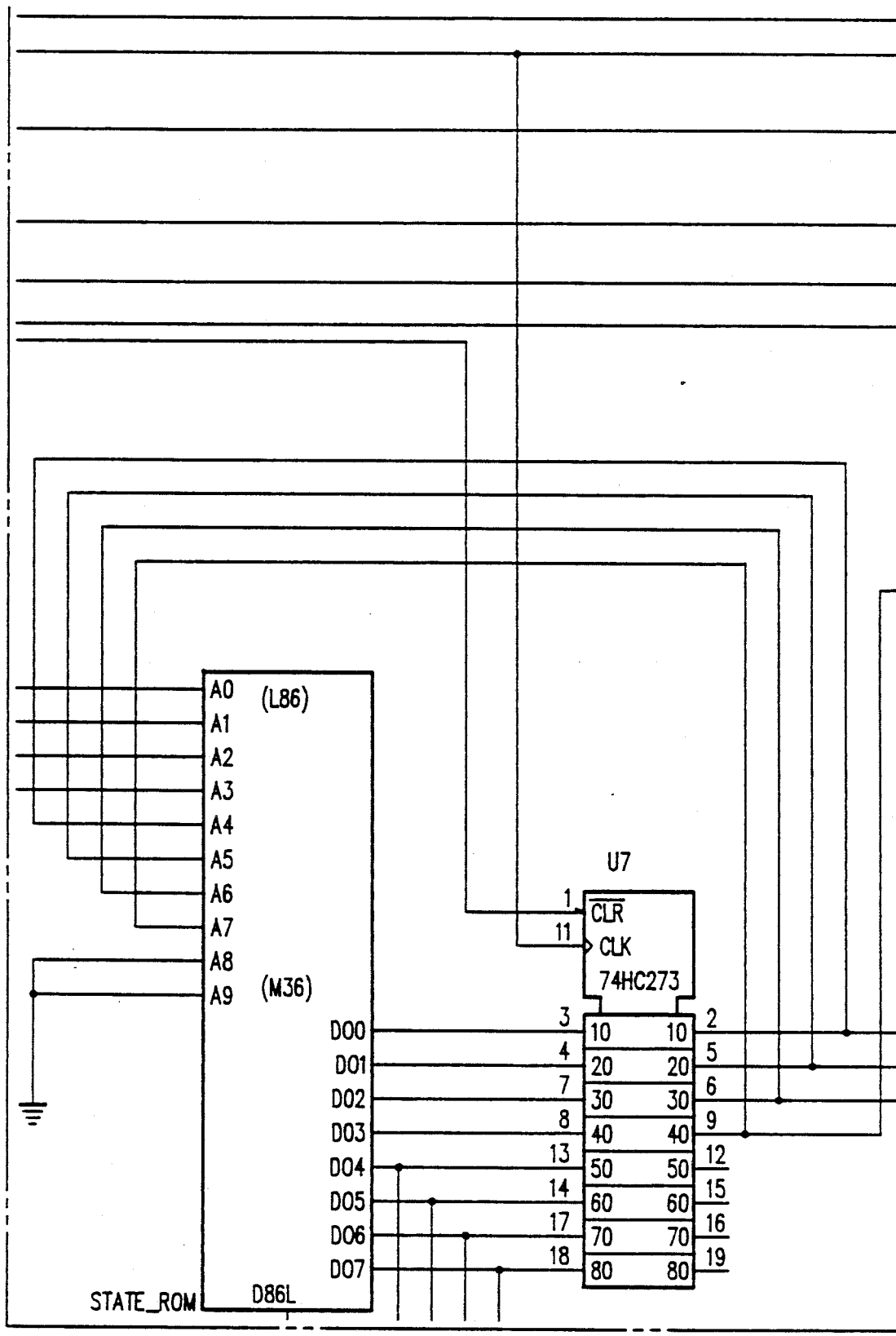
FIG. 7b"

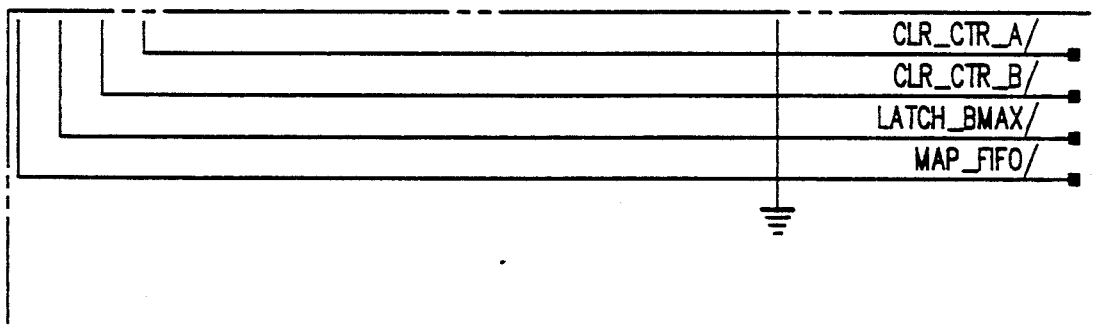
FIG. 7b""
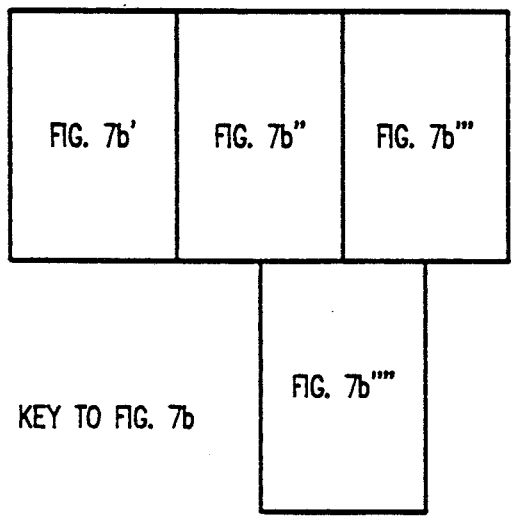
KEY TO FIG. 7b

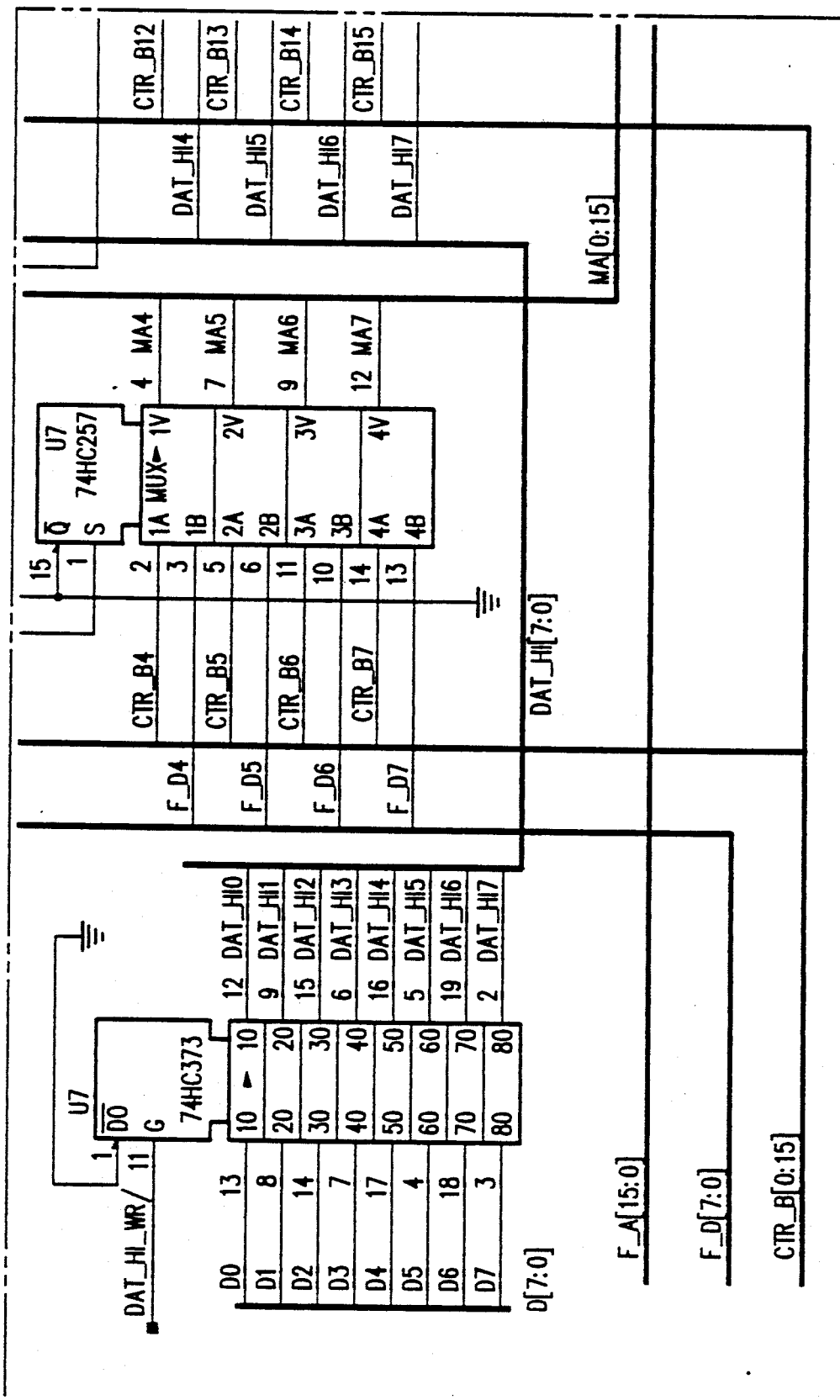
FIG. 8b"

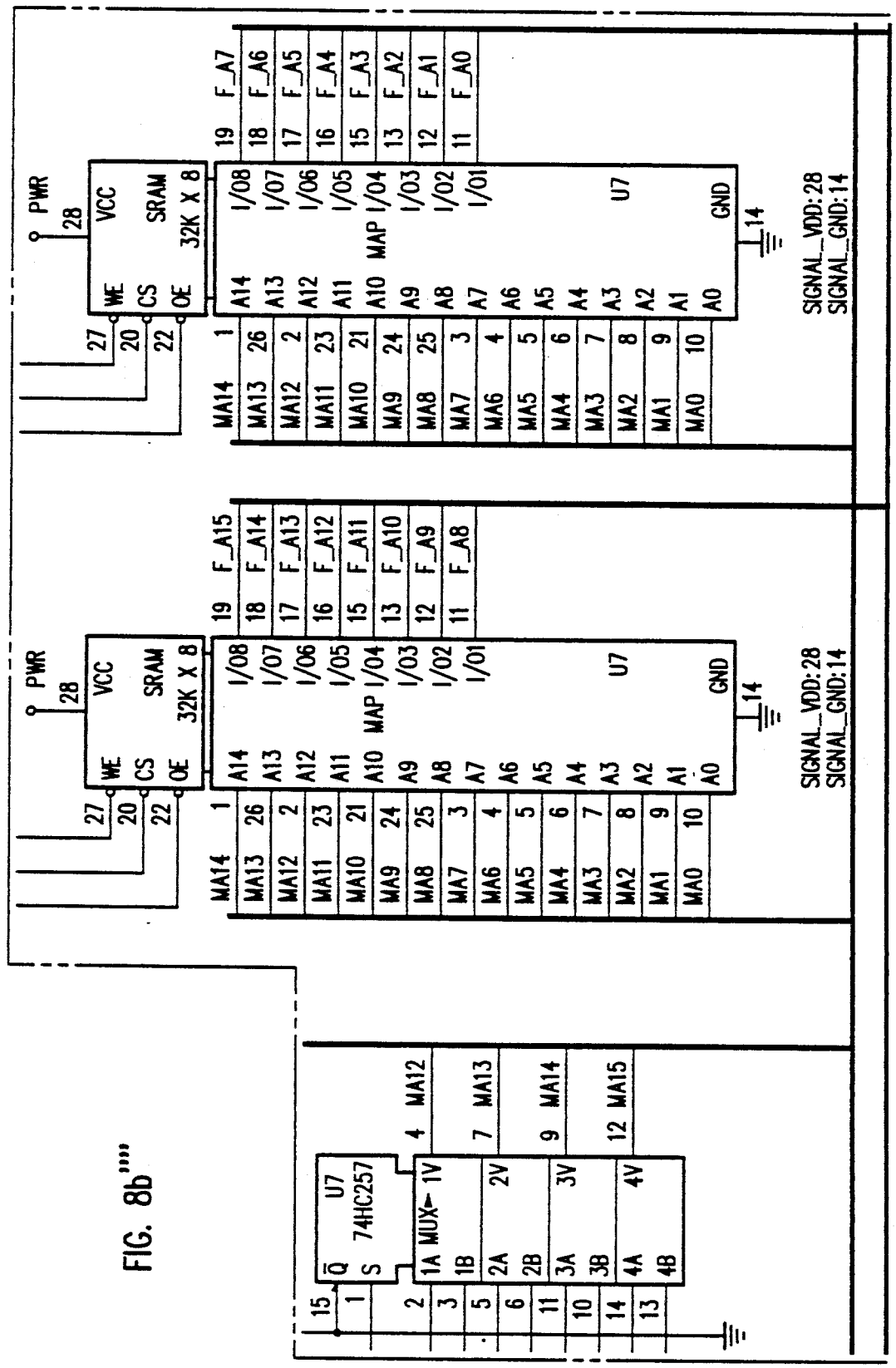
FIG. 8b''''

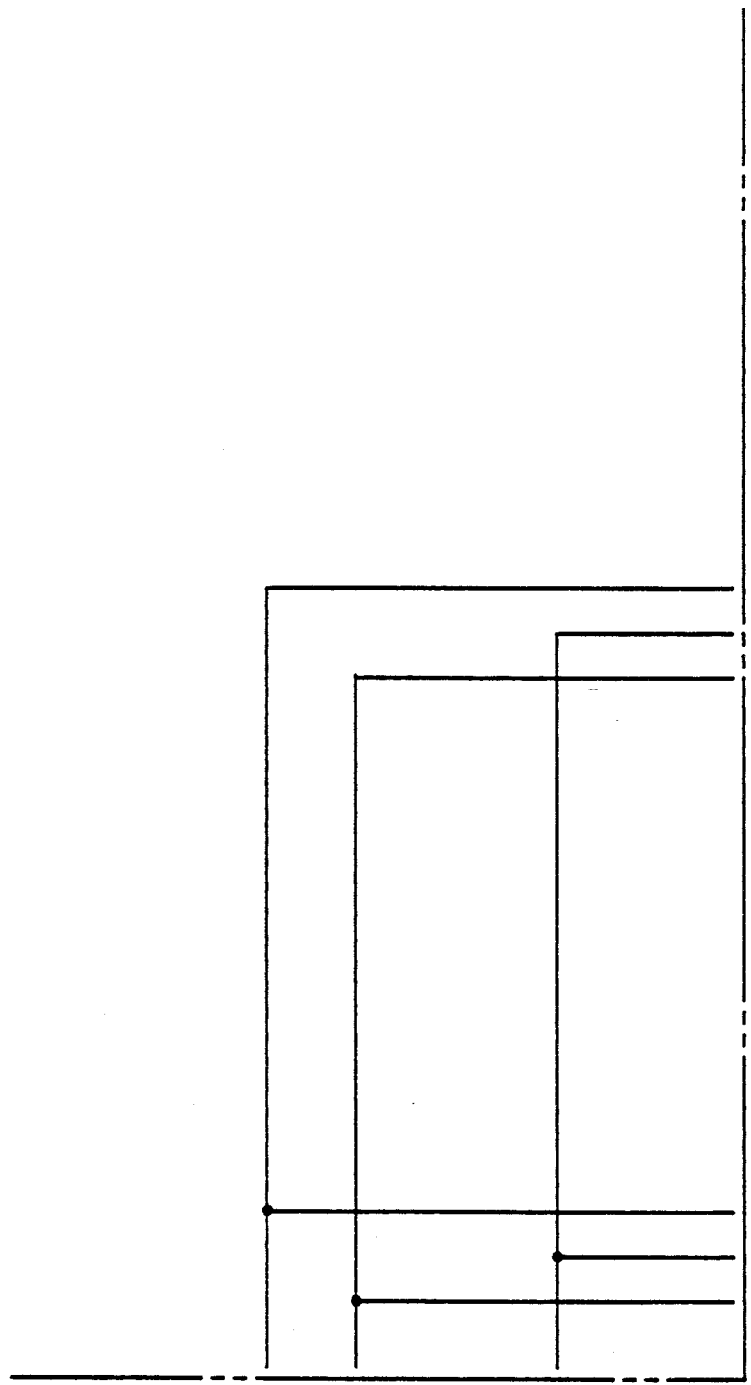

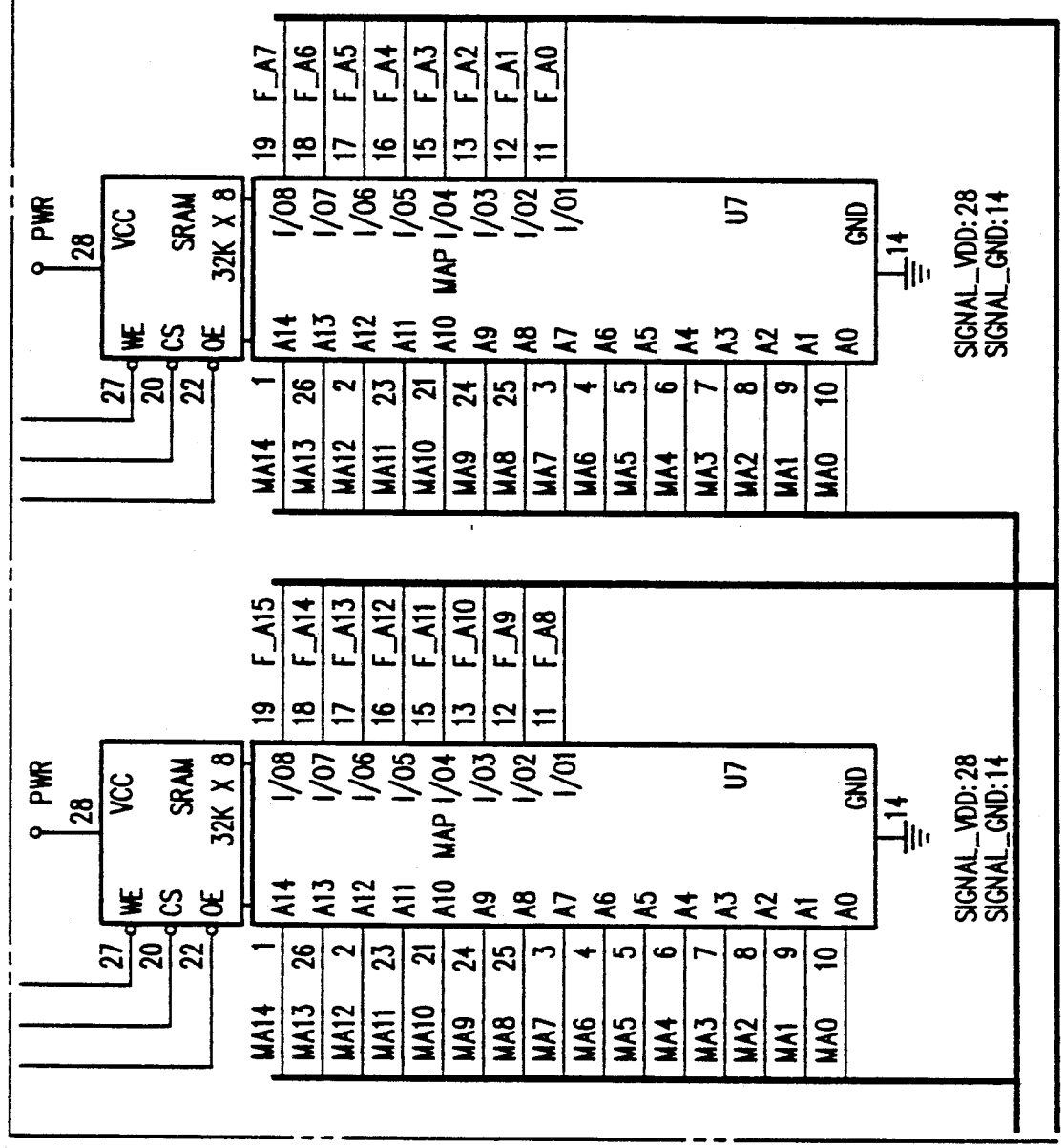
FIG. 8b'''''

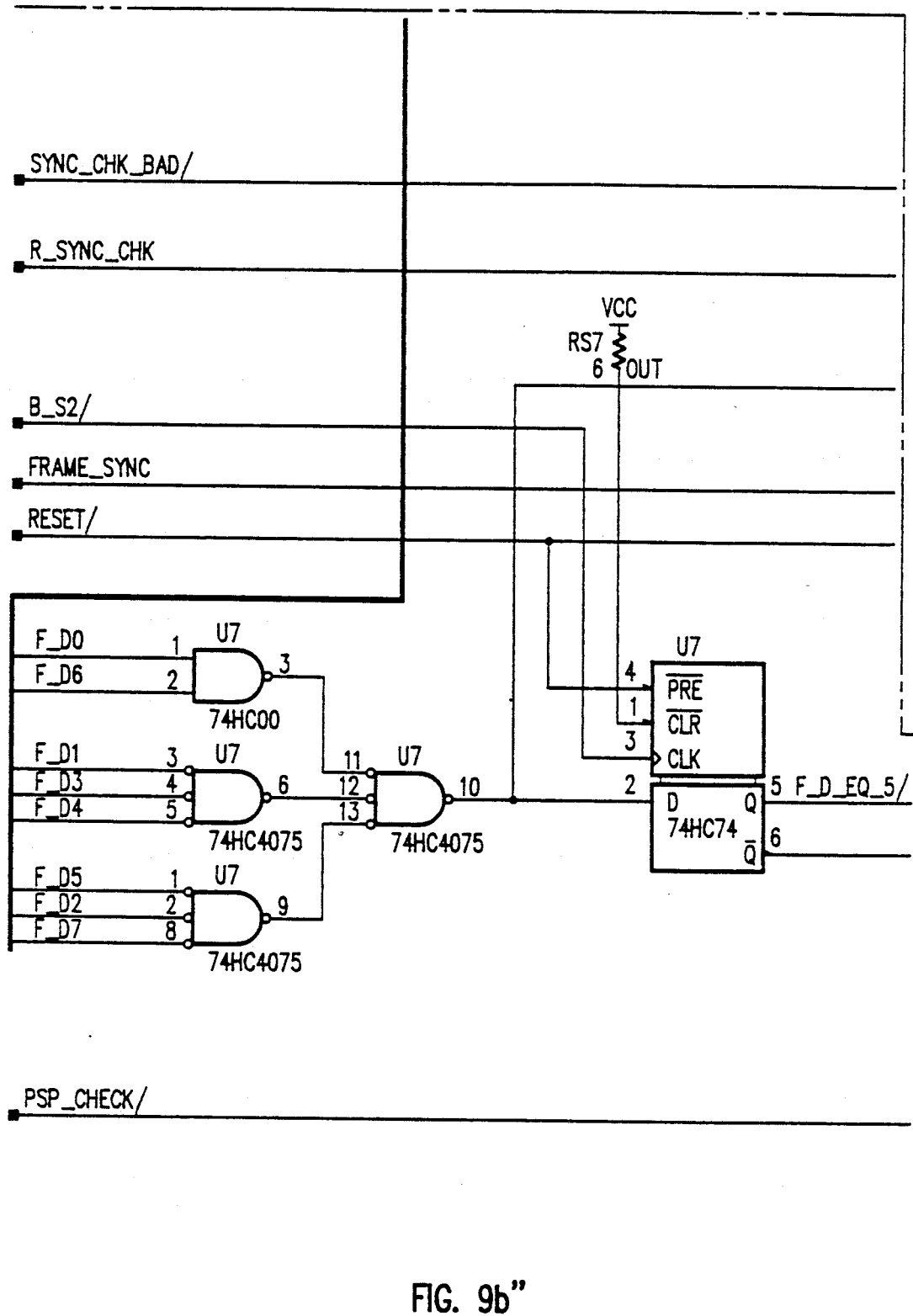
FIG. 9b"

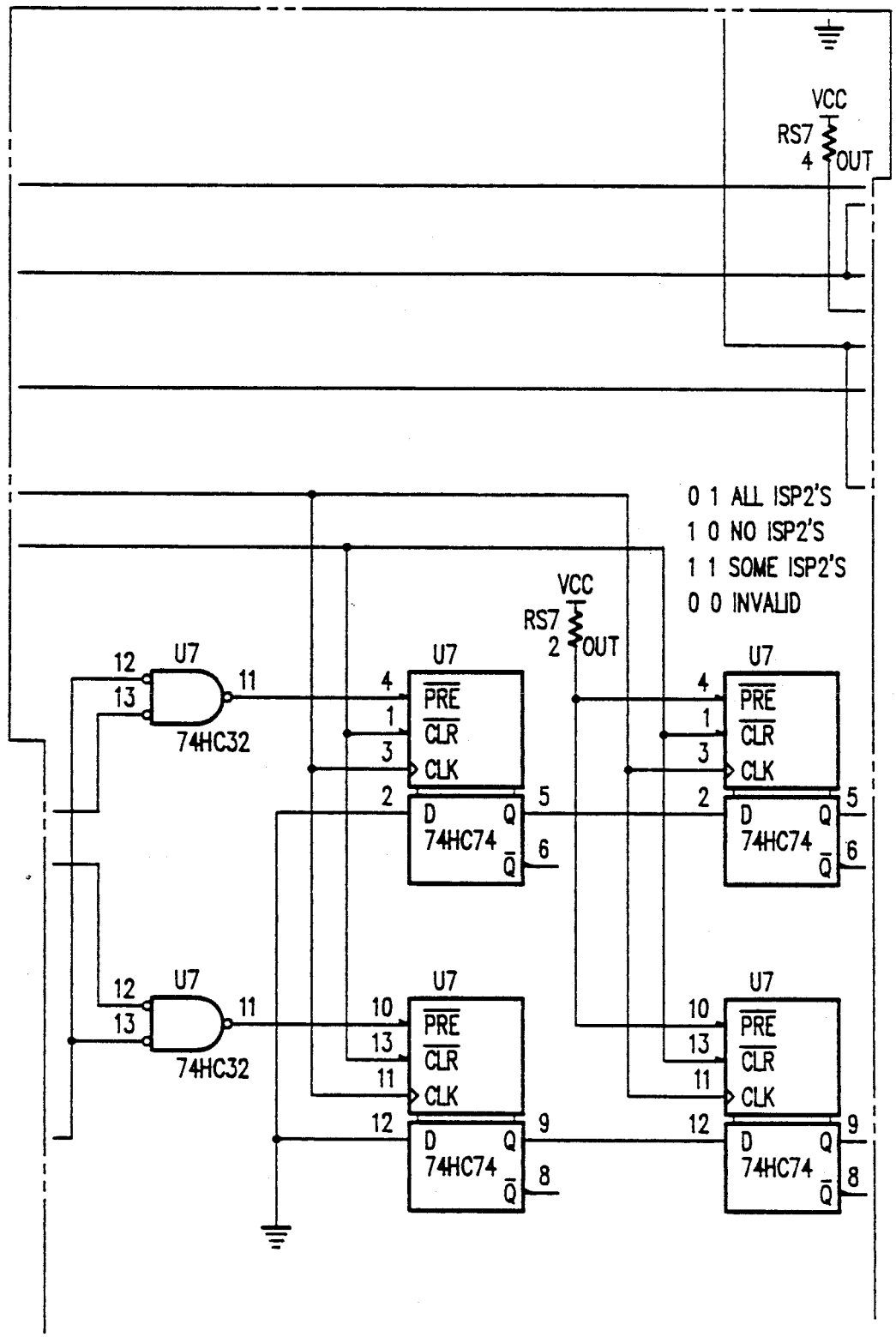
FIG. 9b""

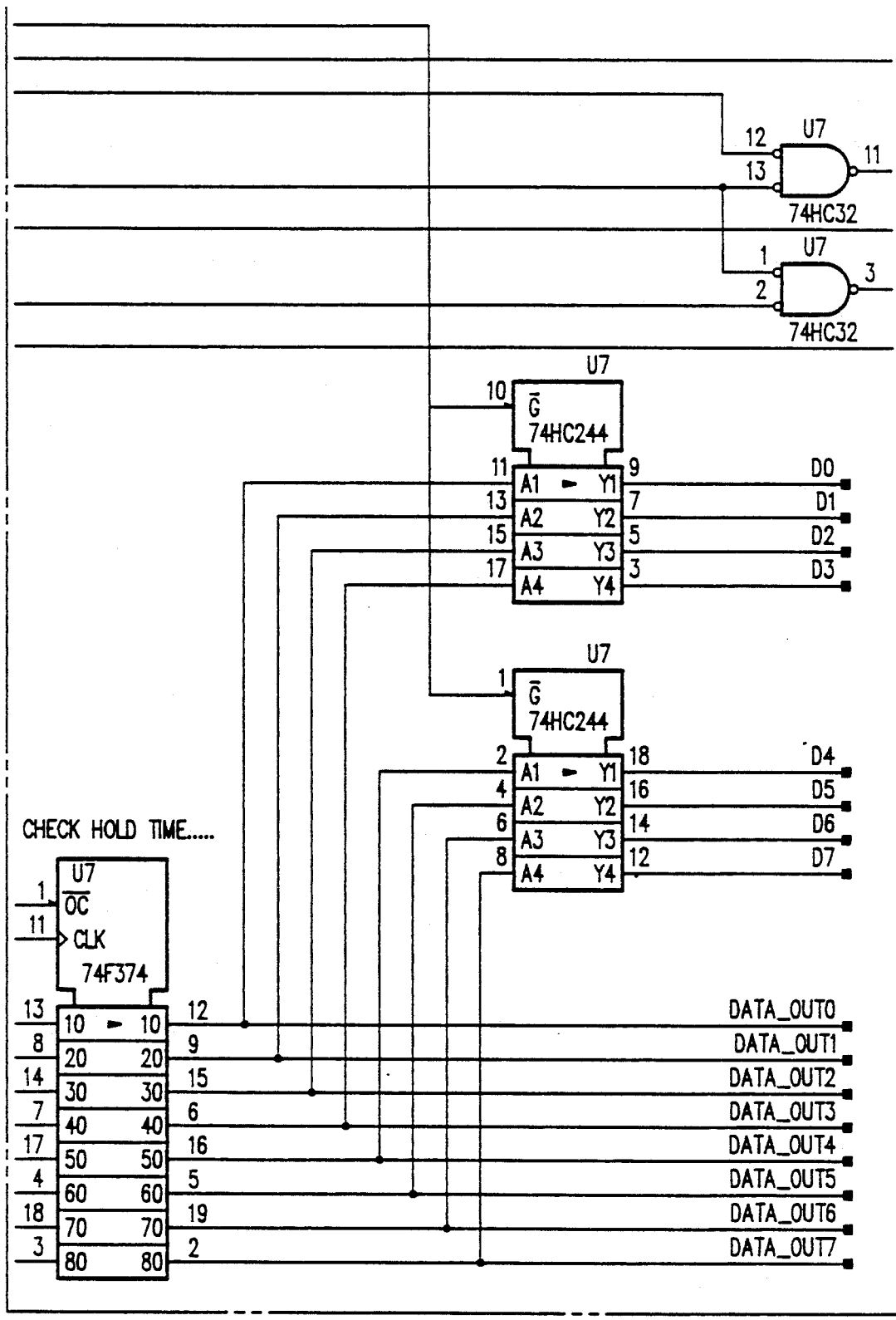
FIG. 9b'''''

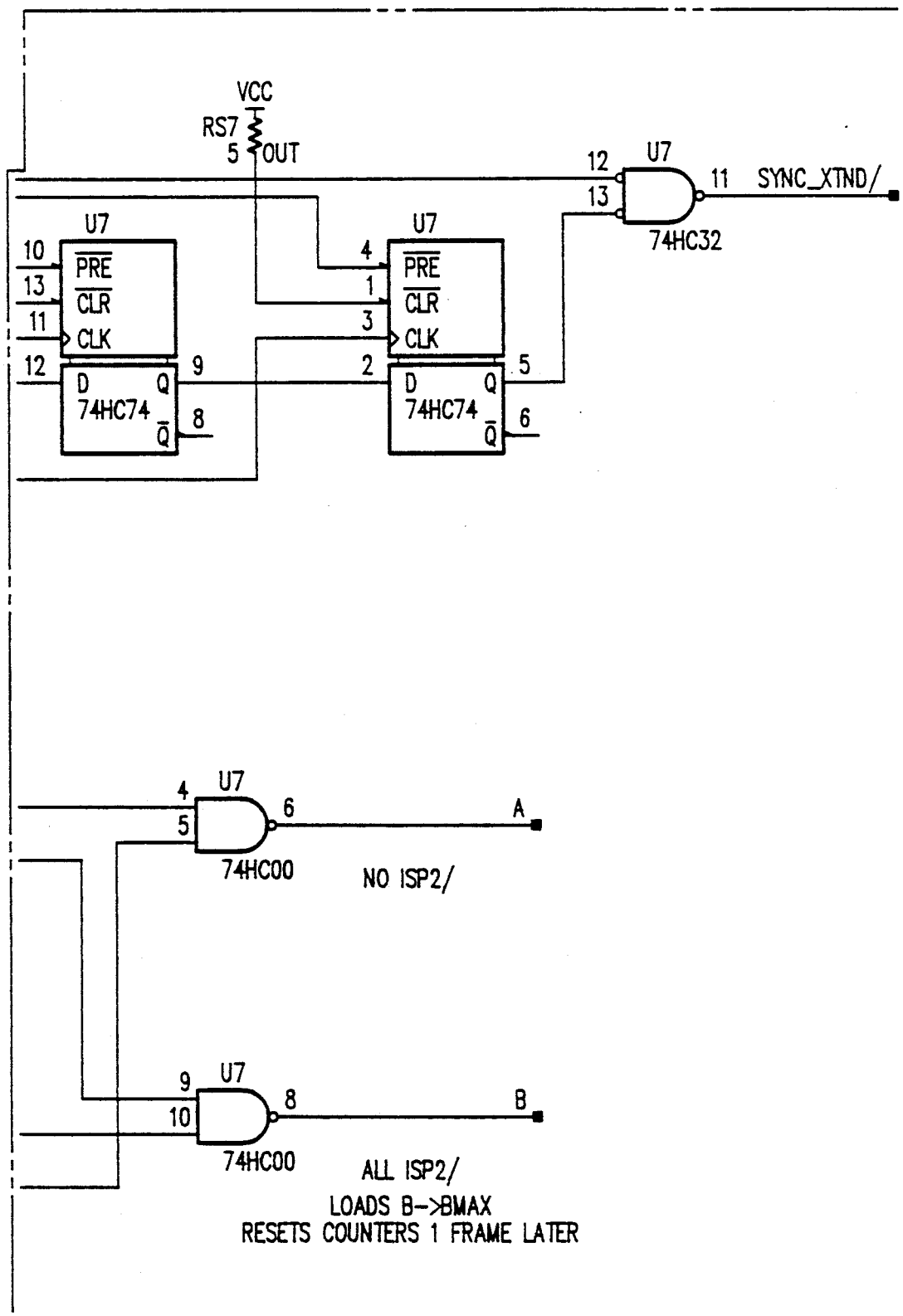
FIG. 9b''''''

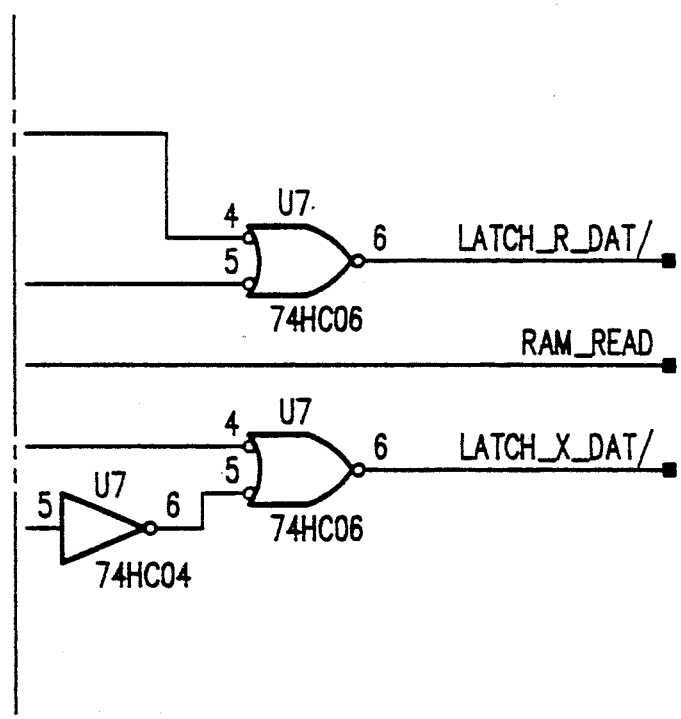
FIG. 9b'''''''
|  |  |  |  |
|---|---|---|---|
| FIG. 9b' | FIG. 9b''' | FIG. 9b''''' | FIG. 9b''''''' |
| FIG. 9b'' | FIG. 9b'''' | FIG. 9b'''''' | |
KEY TO FIG. 9b

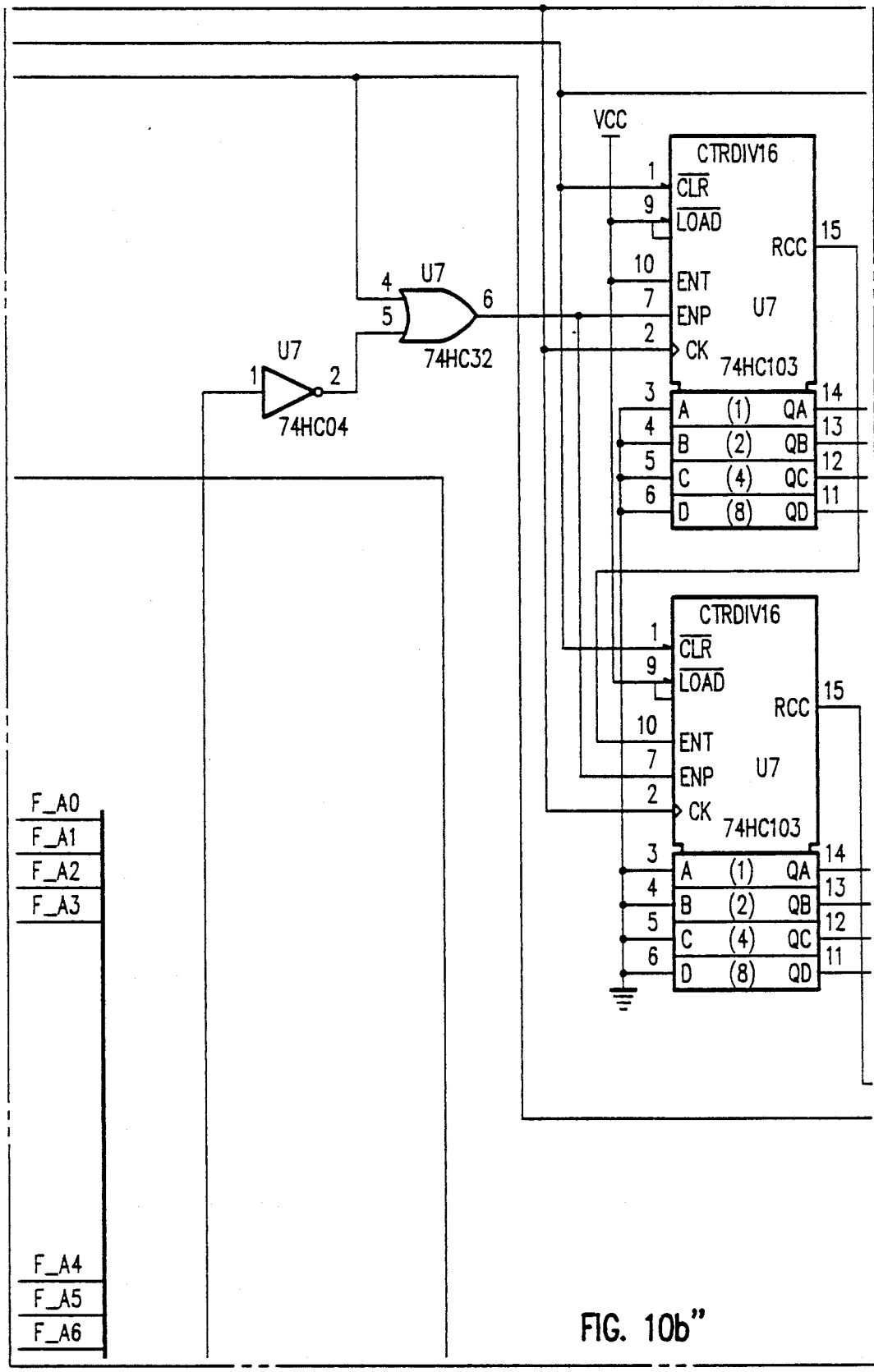
FIG. 10b"

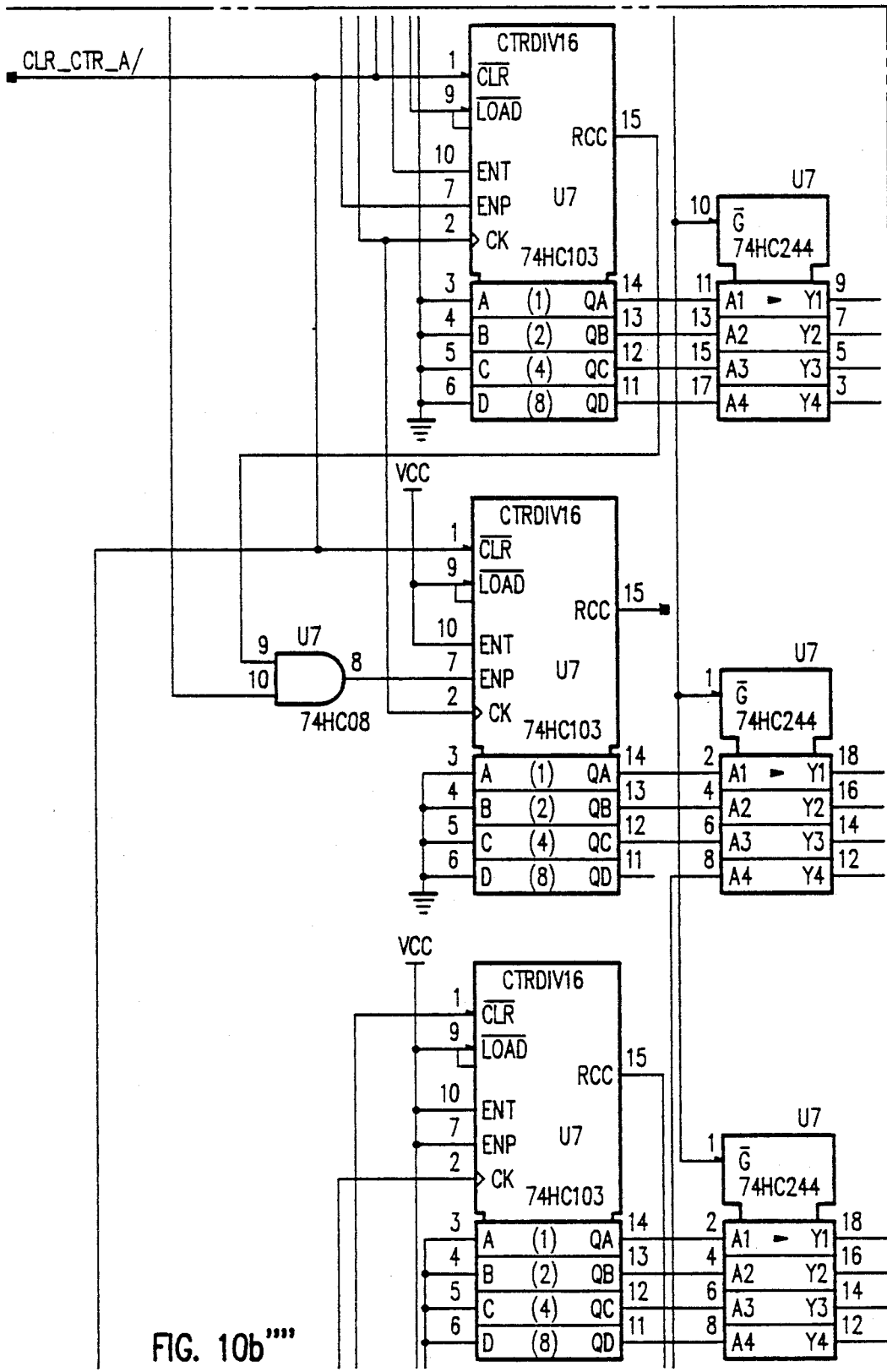
FIG. 10b''''

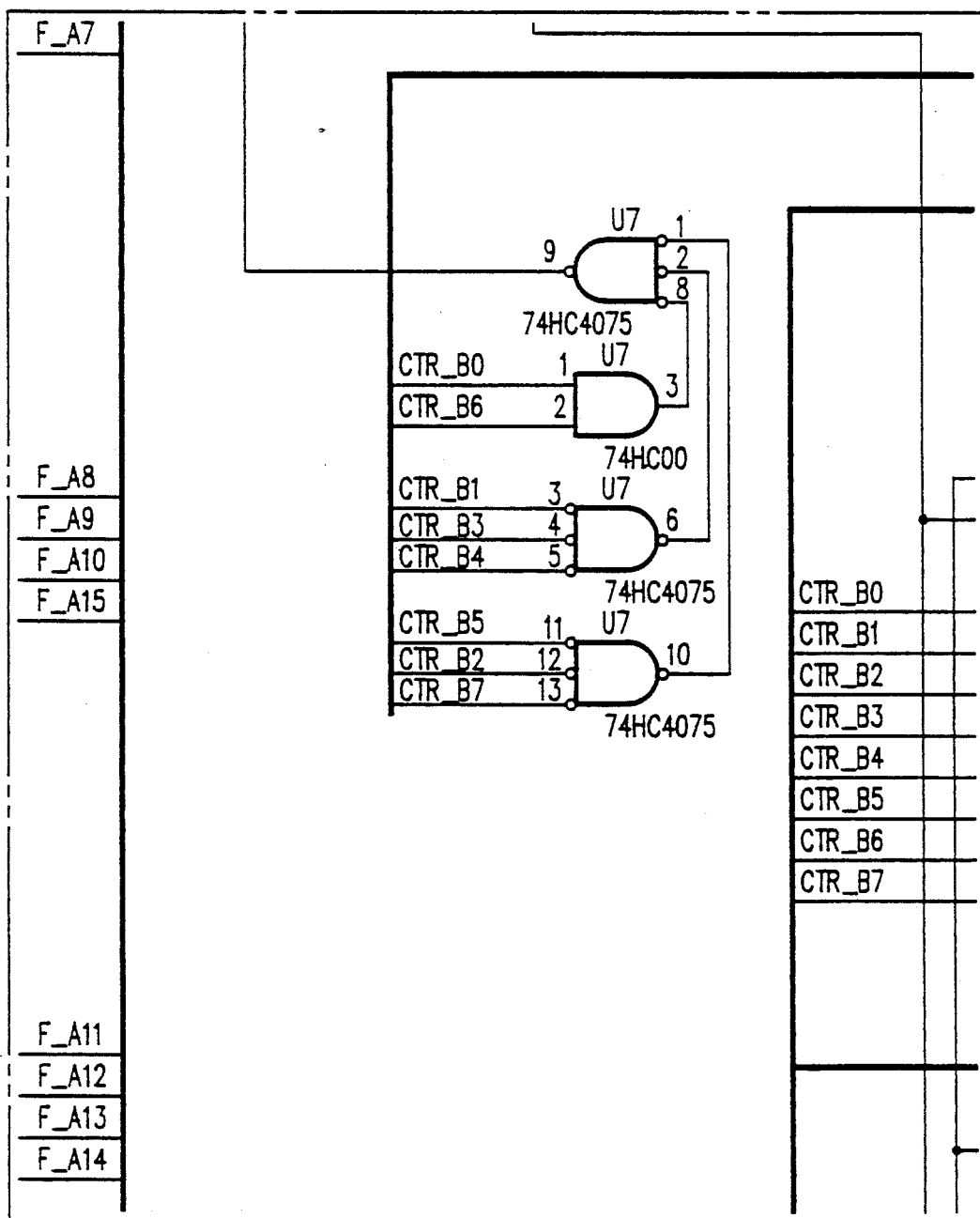
FIG. 10b'''''

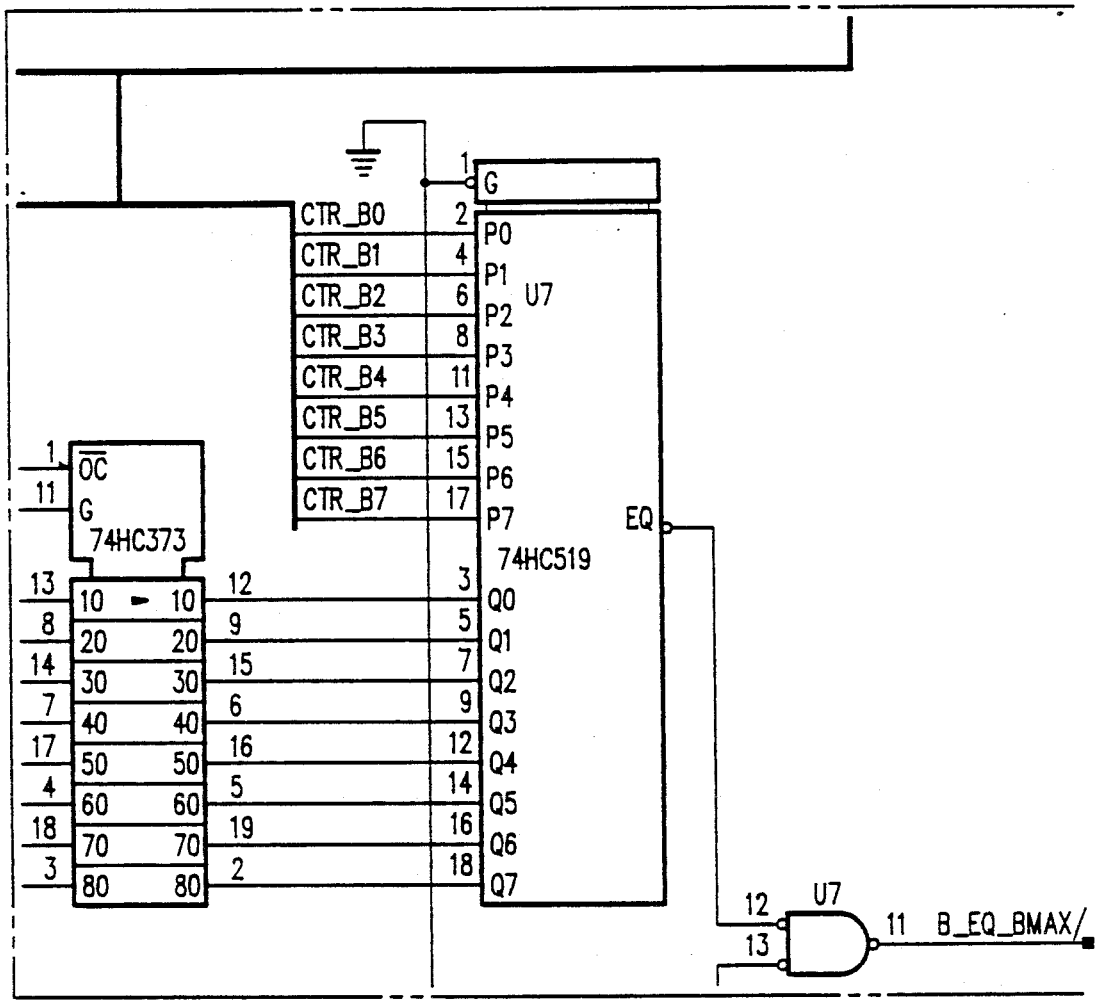
FIG. 10b'''''''

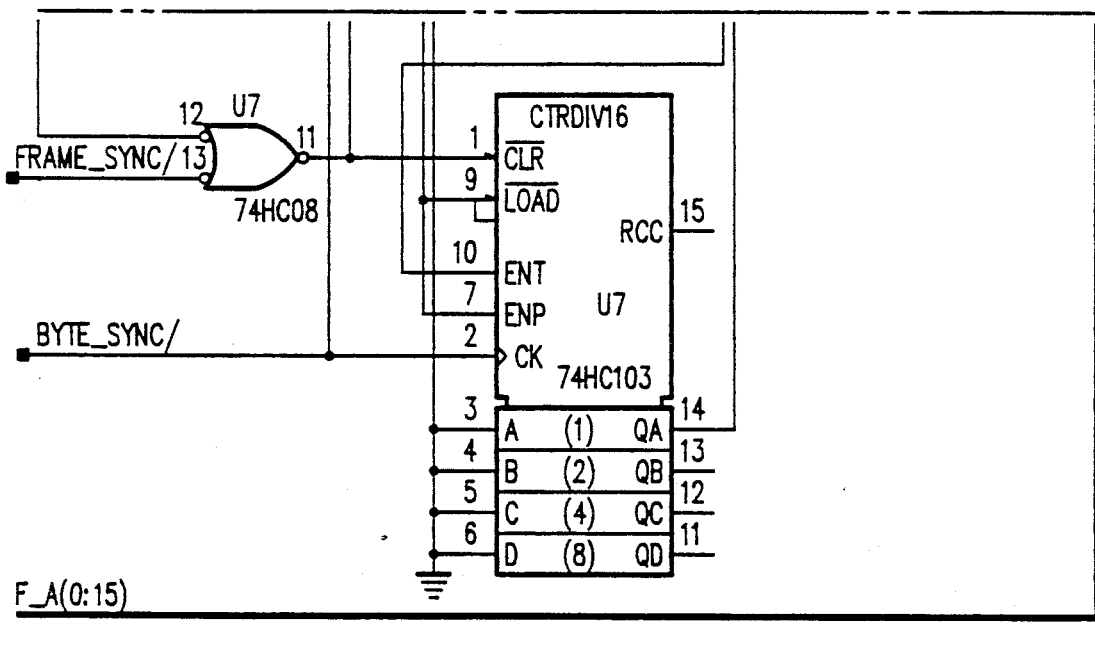
FIG. 10b''''''
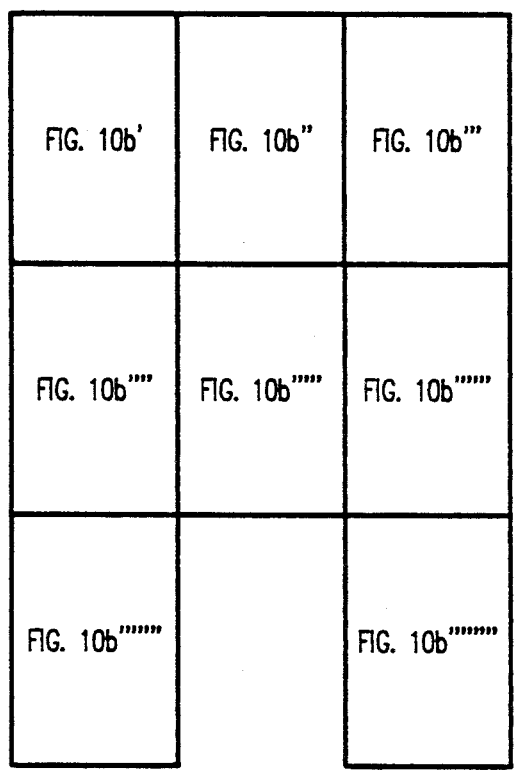
KEY TO FIG. 10b

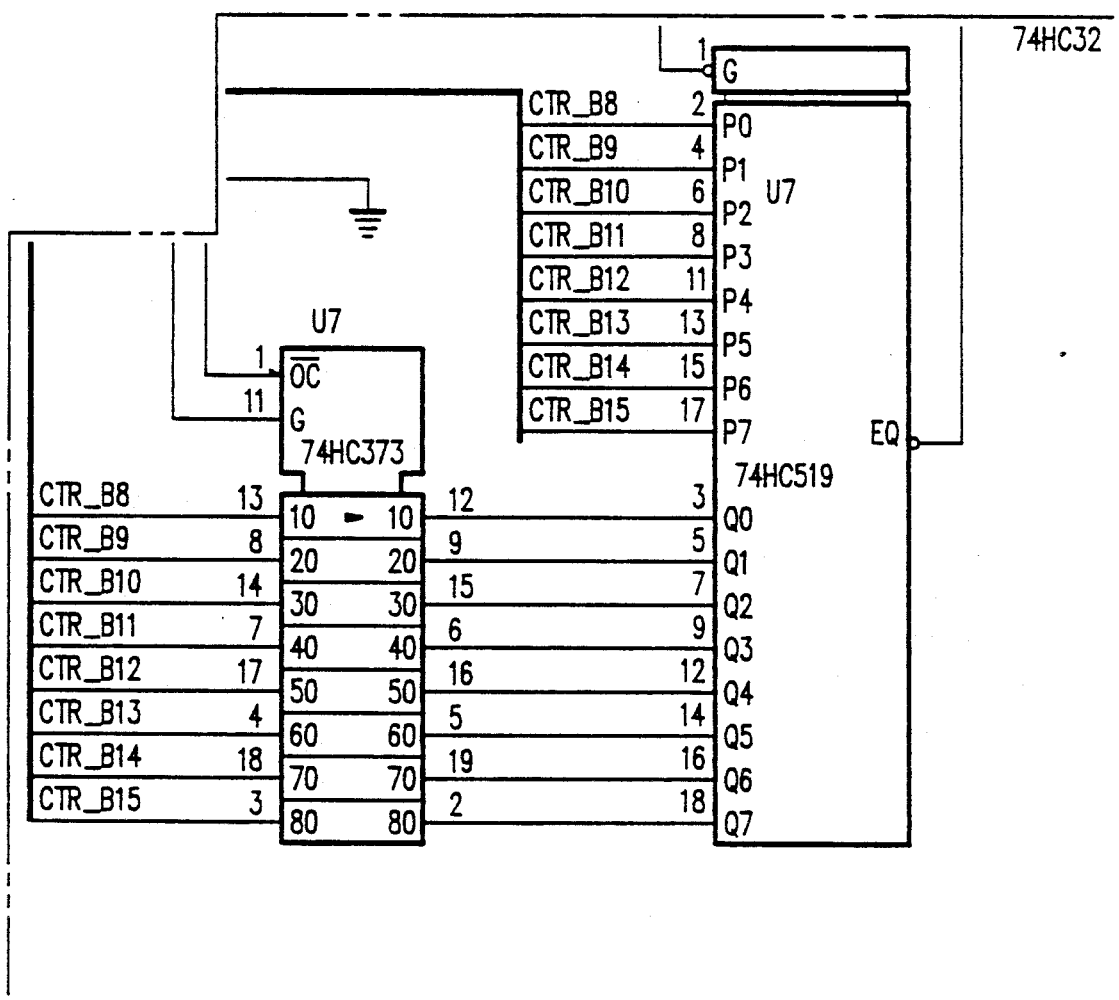
FIG. 10b""""""

METHOD AND APPARATUS FOR DIGITAL COMMUNICATION

TECHNICAL FIELD

The present invention relates to a method and an apparatus for use in a digital communication session. More particularly, the present invention relates to a method and an apparatus which can change dynamically the band width of a digital communication session. The present invention also relates to a method and an apparatus for correcting the phase relationship of a single stream of digital data received from a plurality of digital channels in a communication session.

BACKGROUND OF THE INVENTION

Digital communication is well known in the art. One well known communication standard which is proposed and in some areas is being implemented is the ISDN network standard. The ISDN network standard is a digital communication protocol for a public network (such as one operated by local telephone companies). In the United States, the ISDN network is a digital communication network operating at the rate of 64 kilobits per second per channel. Each channel is called a B channel.

Computers are well known in the art. Typically, however, they operate at a much higher frequency than public communication networks. Thus, for example, computers can store and retrieve data at the rate of millions of bits per second.

As it becomes increasingly desirable to connect computers directly onto public digital communication networks, such as an ISDN network, methods and apparatuses must be provided to interface the computer with the communication network. One prior art technique is disclosed in U.S. Pat. No. 4,775,987. In that patent, a single digital data stream from a source (such as a computer) is supplied to a distributor which supplies a portion of the data cyclically to a plurality of channels. Each of the channels operates at a rate slower than the rate of the single stream of data supplied to the distributor. In this manner, the transmission of data over the plurality of channels, in total, is or exceeds the rate of the single stream of digital data from the source to the distributor.

The problem with such an apparatus is that each of the channels which connects the communication session from one location to another is subject to a different amount of delay. Since these are public access channels, the user cannot control the delay nor a prior determine the amount of delay in each channel. At the receiving end, the delays must be compensated. In U.S. Pat. No. 4,775,987, there is disclosed a technique whereby an adjustable delaying means (shift register) is interposed between each channel and a reassembler. The output of the reassembler is connected to a control unit which controls each of the adjustable shift registers. The transmitting unit first transmits synchronizing data to the receiving unit. Based upon the synchronizing data, the control unit calculates the amount of delay in each of the channels and adjusts the adjustable shift registers, accordingly.

It is believed that this arrangement is expensive to implement in that a shift register must be provided for each of the channels. Further, in the device disclosed in U.S. Pat. No. 4,775,987, once a communication session has begun, the number of channels used for the communication session is fixed and is not varied until the communication session is terminated.

SUMMARY OF THE INVENTION

The present invention relates to a digital data communication system for transmitting and receiving a single digital data stream between a first unit at a first location and a substantially like second unit at a second location. The first unit and the second unit are separated by a plurality of channels with the first unit receiving the single digital data stream. The first unit can transmit the single digital data stream by cyclically distributing the single digital data stream to the plurality of channels in the same order in each cycle. Each of the plurality of channels is subject to a different amount of delay. The second unit has means for receiving the data from each of the channels. The second unit has means for reconstituting the data received from the plurality channels into the transmitted single digital data stream. The improvement of the present invention resides in means for transmitting a command signal by the first unit to the second unit during the transmission of the single digital data stream. Means for responding to the command signal to change the number of plurality of channels for the transmission of the single digital data stream is also provided. Finally, means for establishing the transmission of the single digital data stream over the changed number of channels by the first and second units is also provided.

The present invention also relates to a method and an apparatus for correcting the phase relationship of the data received from a plurality of channels, with each channel subject to a different amount of delay, to reconstitute the transmitted single digital data stream.

BRIEF DESCRIPTION OF THE DRAWINGS

FIG. 3b is a detailed circuit diagram of the diagram shown in FIG. 3a.

FIG. 4b is a detailed schematic diagram of the block diagram shown in FIG. 4a.

FIG. 6b is a detailed circuit diagram of the Figure shown in FIG. 6a.

FIG. 7b is a detailed circuit diagram of the diagram shown in FIG. 7a.

DETAILED DESCRIPTION OF THE DRAWINGS

Figure 1:
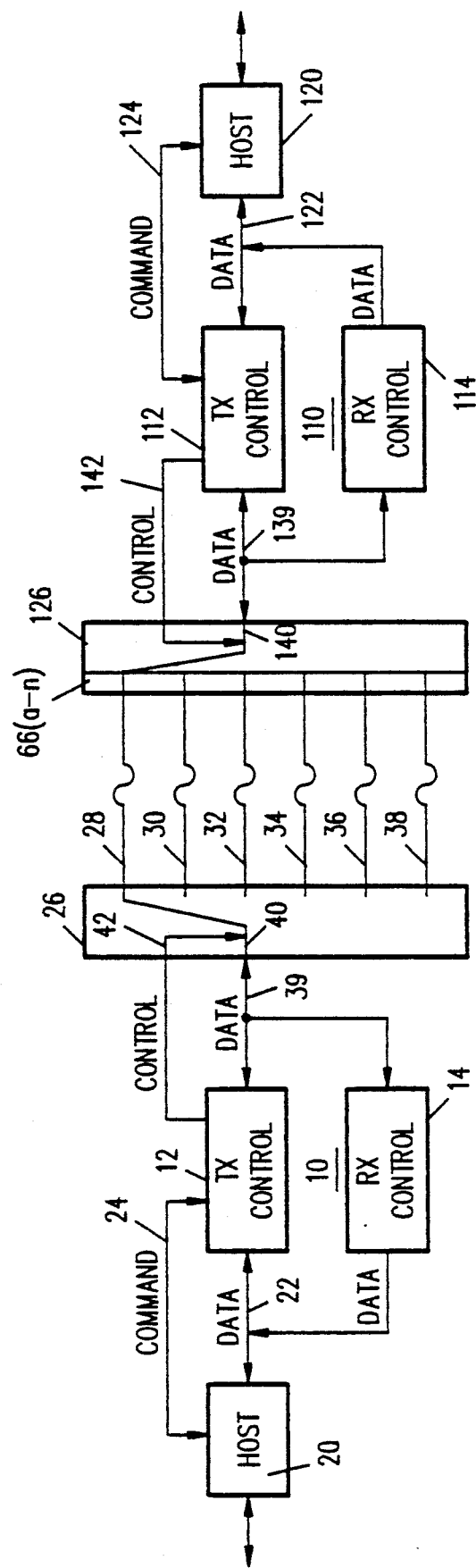
FIG. 1 is a block diagram of one embodiment of the apparatus of the present invention connected to a source of digital data and adapted for transmitting and receiving data over a plurality of channels to a second like unit at another location.

Referring to FIG. 1 there is shown a block diagram of an embodiment of an apparatus 10 of the present invention. The apparatus 10 is shown schematically as comprising a TX control unit 12 (for transmission of data) and an RX control unit 14 (for receiving data). The apparatus 10 is shown as comprising symbolically the TX control unit 12 and the RX control unit 14. As will be seen, the TX control unit 12 and the RX control unit 14 use many common components. The TX control unit 12 is connected to a host 20 via a first digital data link 22. The host 20, which is a source of digital data, such as a computer, supplies a single stream of digital data over the first digital data link 22 to the TX control unit 12. The TX control unit 12 and the host 20 are also connected by the command link 24. The command link 24 supplies the command signals from the TX control unit 12 to the host 20 and visa versa, and it includes signals such as clock, etc.

The single stream of digital data from the host 20 is received by the TX control unit 12 and is supplied to a distributor 26, via a second digital data link 39. The distributor 26 is connected to a plurality of communication N channels 28, 30, 32, 34, 36 and 38. Each of the channels is subject to a delay, with D as the maximum delay of all the channels, relative to each other. As will be appreciated, although only six channels are shown, the invention is not so limited and can be used with any number of plurality of channels. The data is supplied from the TX control unit 12 to a switch 40 within the distributor 26. The switch 40 is controlled by the TX control unit 12 through a control link 42. The function of the switch 40 is to cyclically place data from the TX control unit 12 and ultimately from the host 20 over each of the plurality of channels (28-38).

The apparatus 10 of the present invention is particularly suited for interfacing with an ISDN network. Hereinafter, the apparatus 10 will be described with respect to its connection to and operation with an ISDN network. However, it should be apparent to those skilled in the art that the invention is not so limited and can be used with any type of analog or digital communication network.

The apparatus 10 also comprises an RX control unit 14 which receives digital data from the switch 40 reassembled into a single stream of digital data. The data from the RX control unit 14 is then supplied to the first digital link 22 which is then supplied to the host 20.

The apparatus 10 is connected to the distributor 26 located at a first location. The plurality of channels (28-38) connect the digital communication from the apparatus 10 at the first location to a second location. At a second location, a substantially like apparatus 110 is located. Similar to the apparatus 10, the apparatus 110 comprises a TX control unit 112, connected to the switch 140, and controlling the switch 140 through a control link 142. The TX control unit 112 is also connected to a second host 120 via a data link 122. The host 120 and the TX control unit 112 also communicate through a command link 124. In addition, data from the second distributor 126 is received by the RX control unit 114 and is supplied to the data link 122 to the host 120.

As will be appreciated from a review of FIG. 1, each of the apparatuses 10 and 110 can transmit data to the other like unit and simultaneously receive data from the other like unit in a full duplex communication session. Since the apparatus 10 and 110 are similar, the description that follows will be of the apparatus 10.

Figure 2:
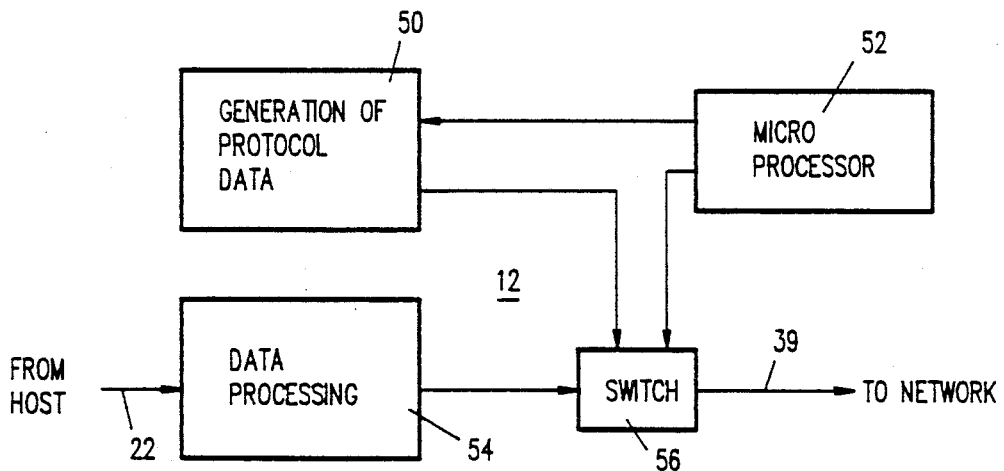
FIG. 2 is a block diagram of the transmission control circuit of the apparatus of the present invention shown in FIG. 1.

Referring to FIG. 2, there is shown a schematic block diagram of the components of the transmission control 12 of the apparatus 10 of the present invention. Data, received from the host 20, over the first digital data link 22, is supplied to a data processing unit 54. From the data processing unit 54, data is supplied to a switch 56. The transmission control 12 also comprises a means to generate protocol data 50. The protocol data generated by the generator 50, is also supplied to the switch 56. A microprocessor 52, is used to control the generation protocol data 50 and the switch 56. Data, whether it's data from the data processing unit 54 or from the generator 50, is supplied from the switch 56, via the second digital data link 39 to the switch 40.

The data from the host 20 is supplied to the data processing unit 54, which comprises a FIFO (first in first out) unit 60. From the FIFO unit 60, the data is supplied to a time division multiplex slot unit 61, wherein the data in each slot of time is placed on a channel by the switch 40. The unit 61 can be another FIFO circuit.

A transmission clock control unit 62 generates various clocking signals which are supplied to the host 20 over the command 24. In one example, the clocking control circuitry 62 supplies a clock signal at the rate of 56K×N. 56K is the rate of the bits per second each ISDN channel can handle. "N" is the number of channels to which the apparatus 10 is connected.

Figure 3A:
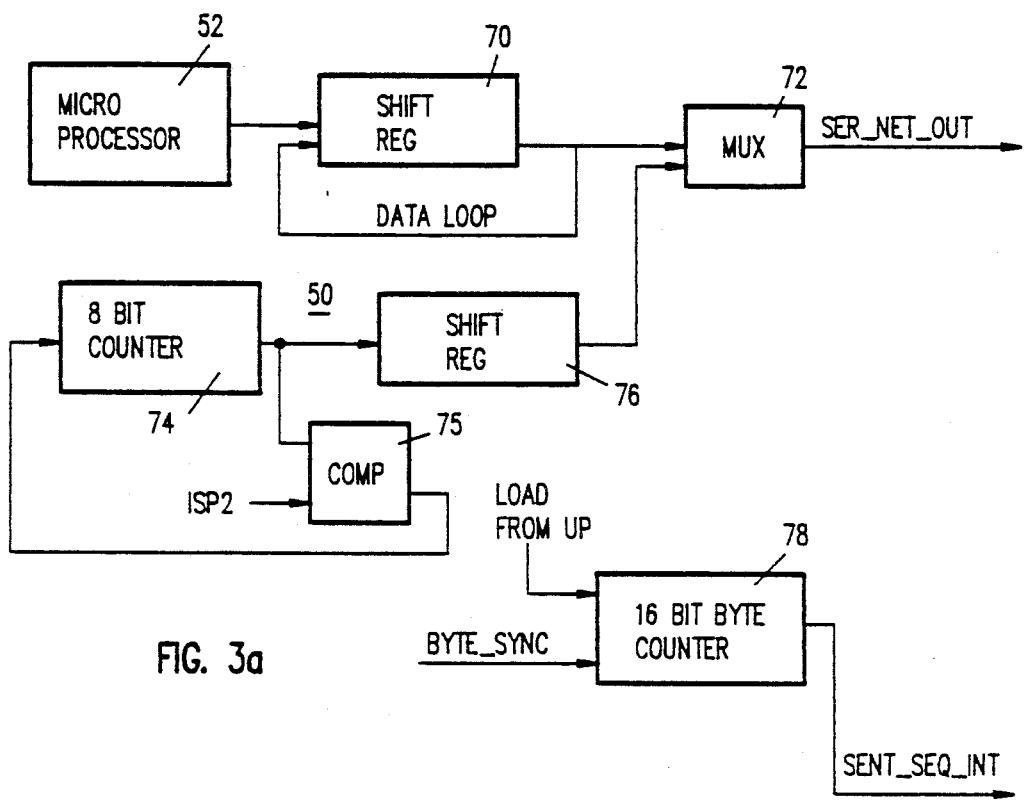
FIG. 3a is a detailed block diagram of one component of the transmission control circuit shown in FIG. 2, for the generation of protocol data.
Figure 3B:
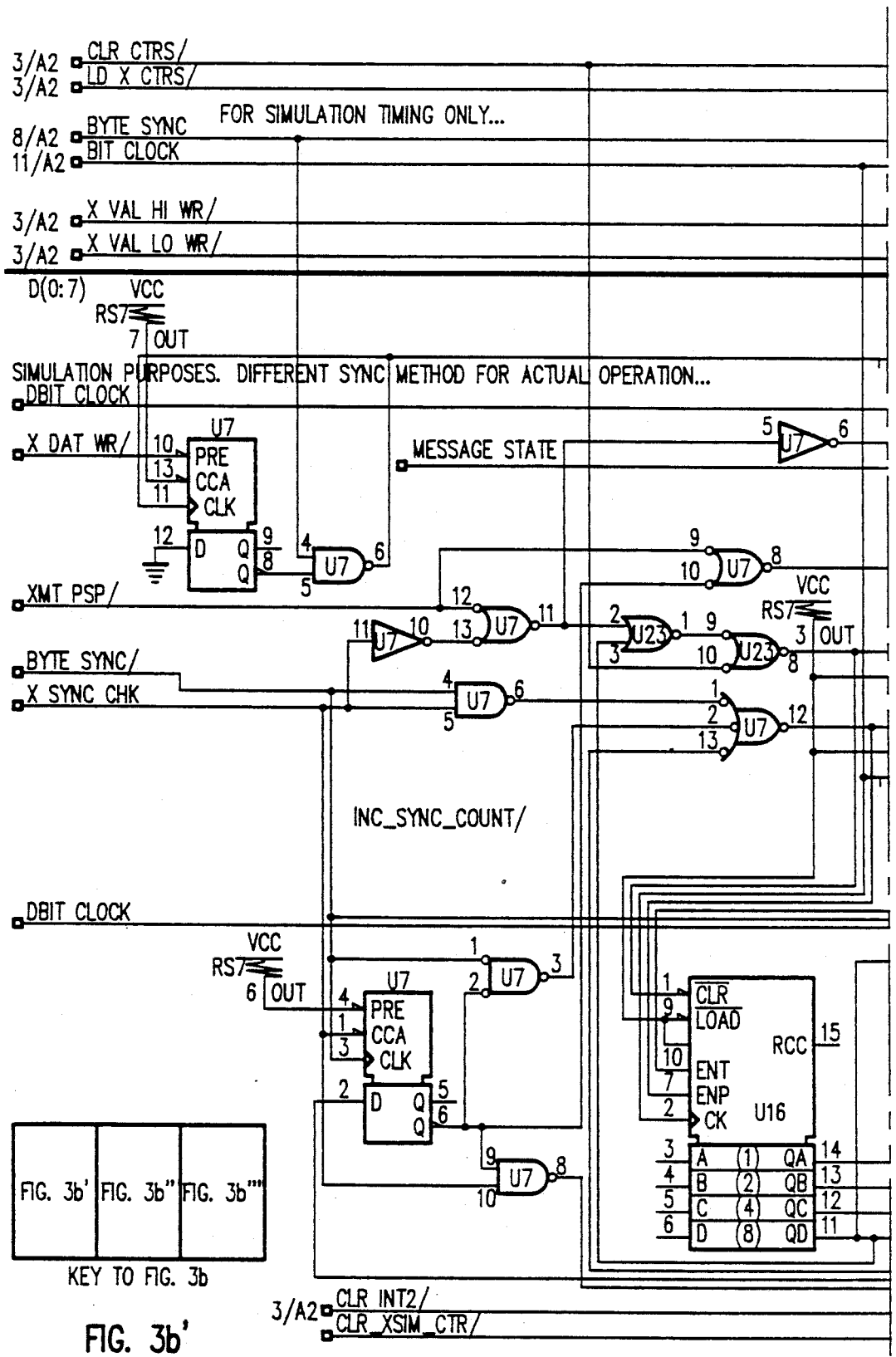
Figure 3B:
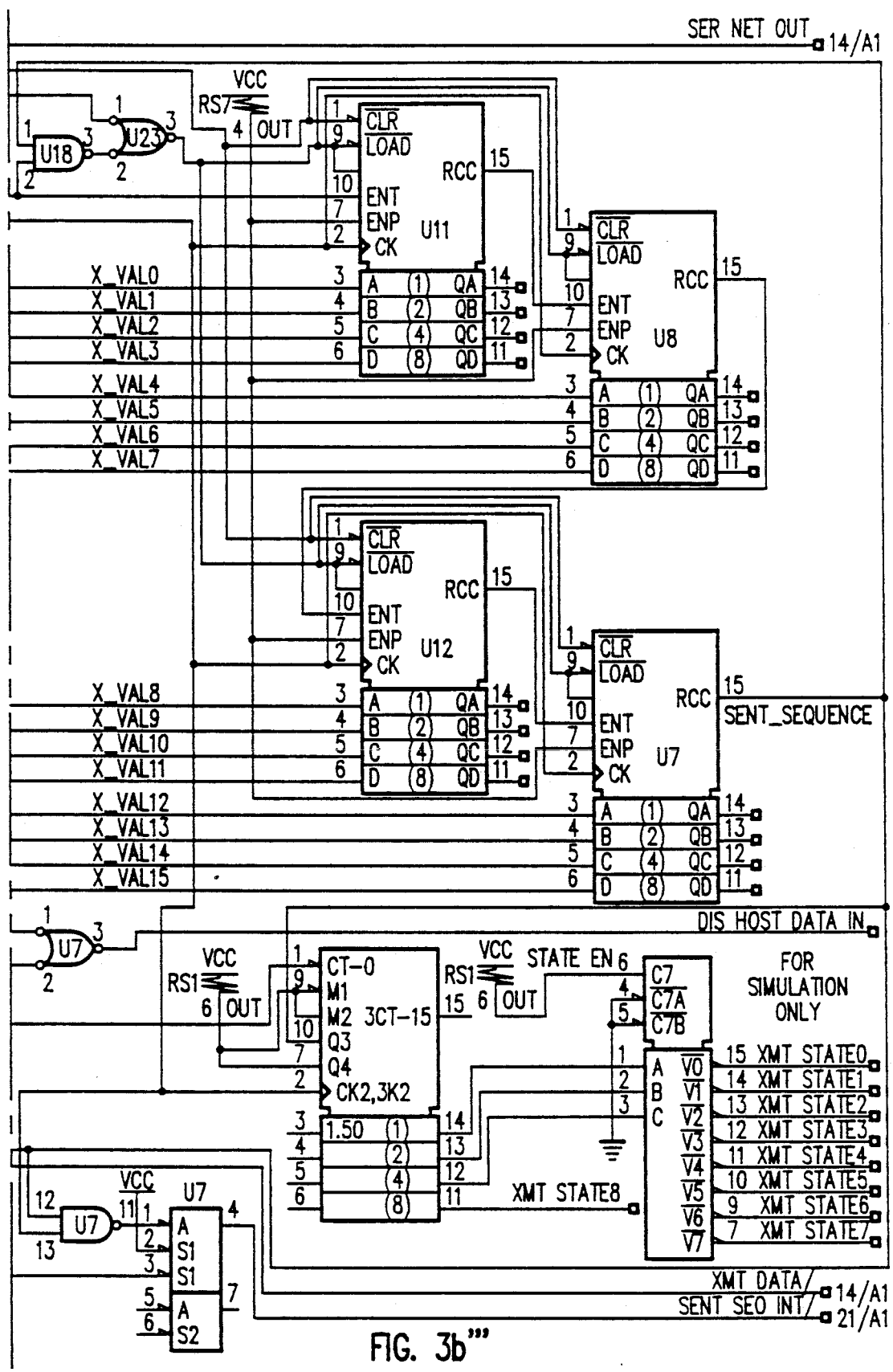
Figure 4A:
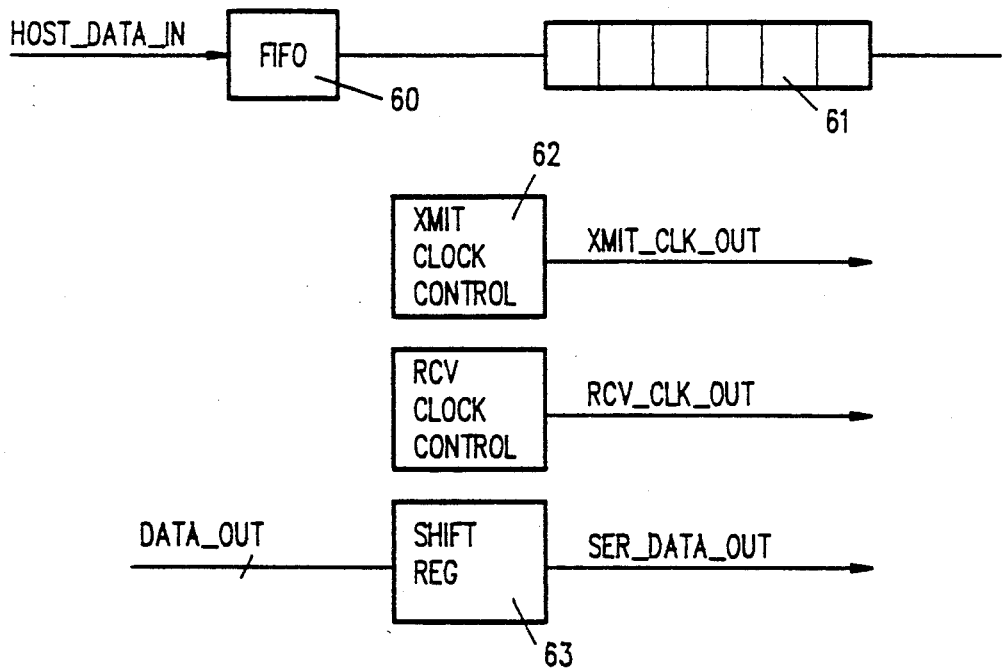
FIG. 4a is a detailed block diagram of a component of the transmission control circuit shown in FIG. 2.

Referring to FIG. 3a, there is shown in greater detail the generation of protocol data unit 50. The microprocessor 52 loads a specific data value into a shift register 70. The output of the shift register 70 is connected in a feedback loop through a data loop, back to the input of the shift register 70. The output of the shift register 70 is also supplied to a MUX 72. The output of the MUX is the data SER_NET_OUT.

An 8 bit counter 74 supplies the output thereof to a second shift register 76. From the second register shift register 76, the output is also supplied to the MUX 72.

Finally, data from the microprocessor 52 can be loaded into a 16 bit byte counter 78. A BYTE_SYNC signal is used to load the data from the microprocessor 52 into the counter 70. The output of the 16 bit byte counter 78 is the signal SENT_SEQ INT.

From the switch 56, the data is supplied to a second digital data link 39 to the switch 40.

The switch 40 is activated to sequence through the plurality of channels (28-38). A piece of data is placed on each of the channels (28-38) during the signal cycle. The amount of data placed on each channel in a single cycle shall be referred to as a "frame". The switch 40 is switched sequentially and in the same order in each cycle through all of the channels.

Each frame of data supplied from the second data link 39 to the switch 40 is distributed in a form of non-statistical multiplexing. Thus, in each slice of time, an equal amount of digital data is distributed sequentially over each of the available channels, as in time-division multiplexing. The size of the data that is placed on each of the channels at each moment in time or the "frame" of the data can be any arbitrary size. In particular, the data can be as small as one bit or as large as an 8-bit byte. In the preferred embodiment, an 8-bit byte of frame data is distributed over each of the channels.

Figure 5:
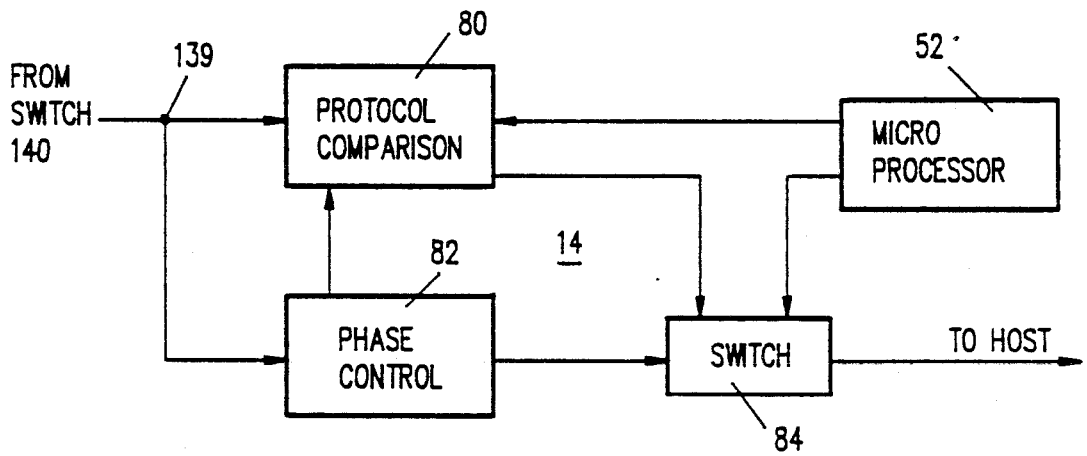
FIG. 5 is a block diagram of the receive control circuit of the apparatus of the present invention shown in FIG. 1.
Figure 4B:
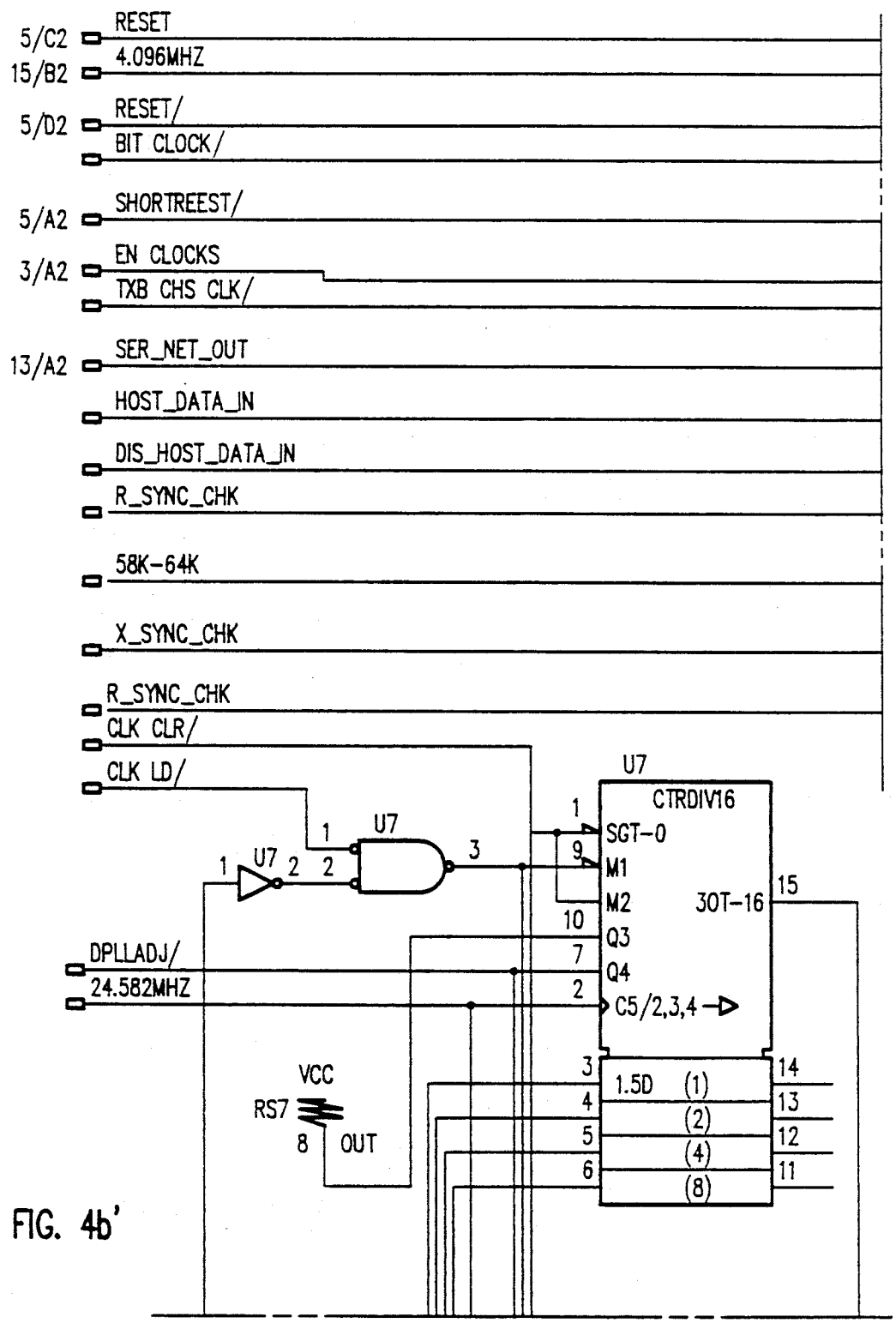
Figure 4B:
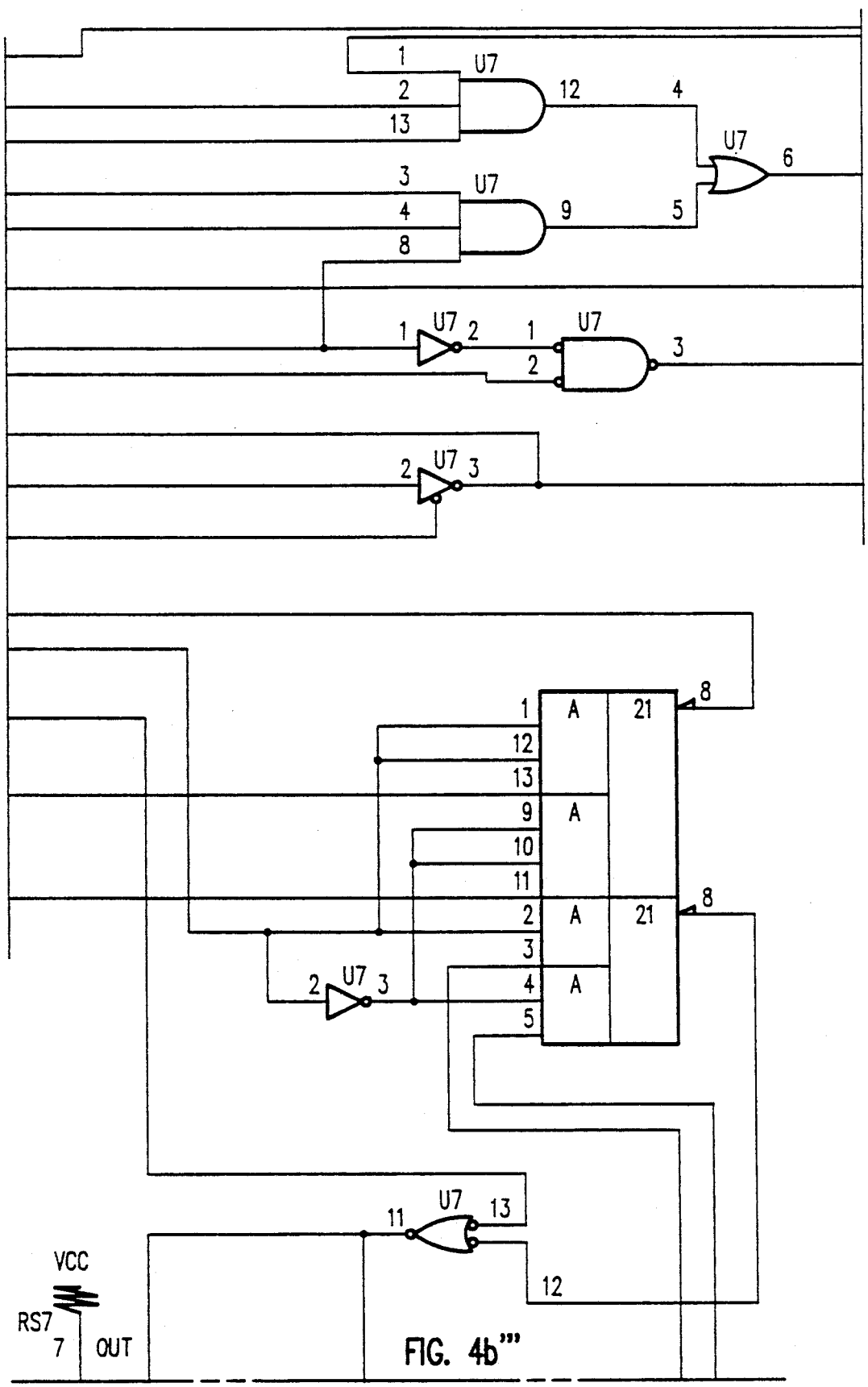
Figure 4B:
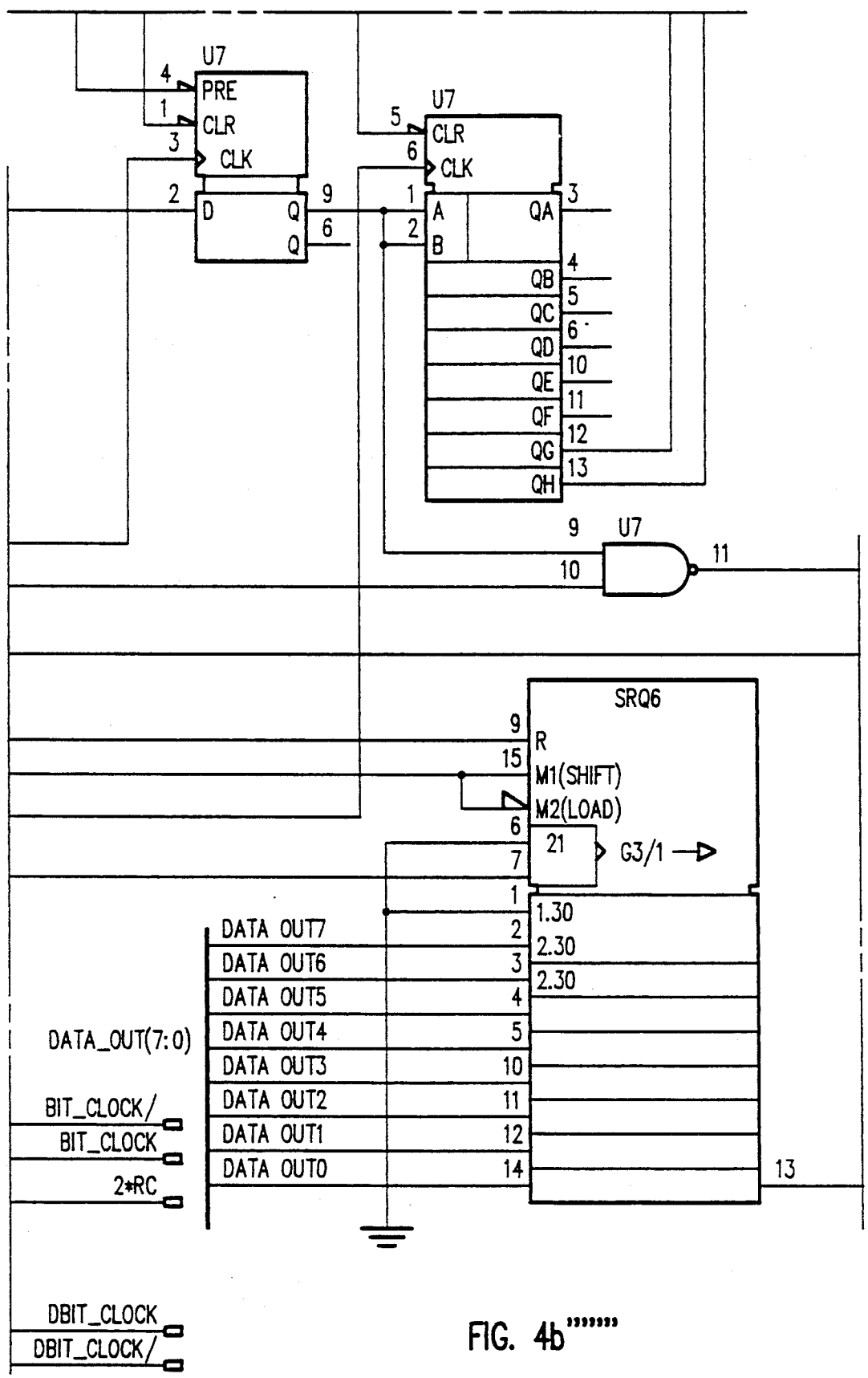
Figure 4B:
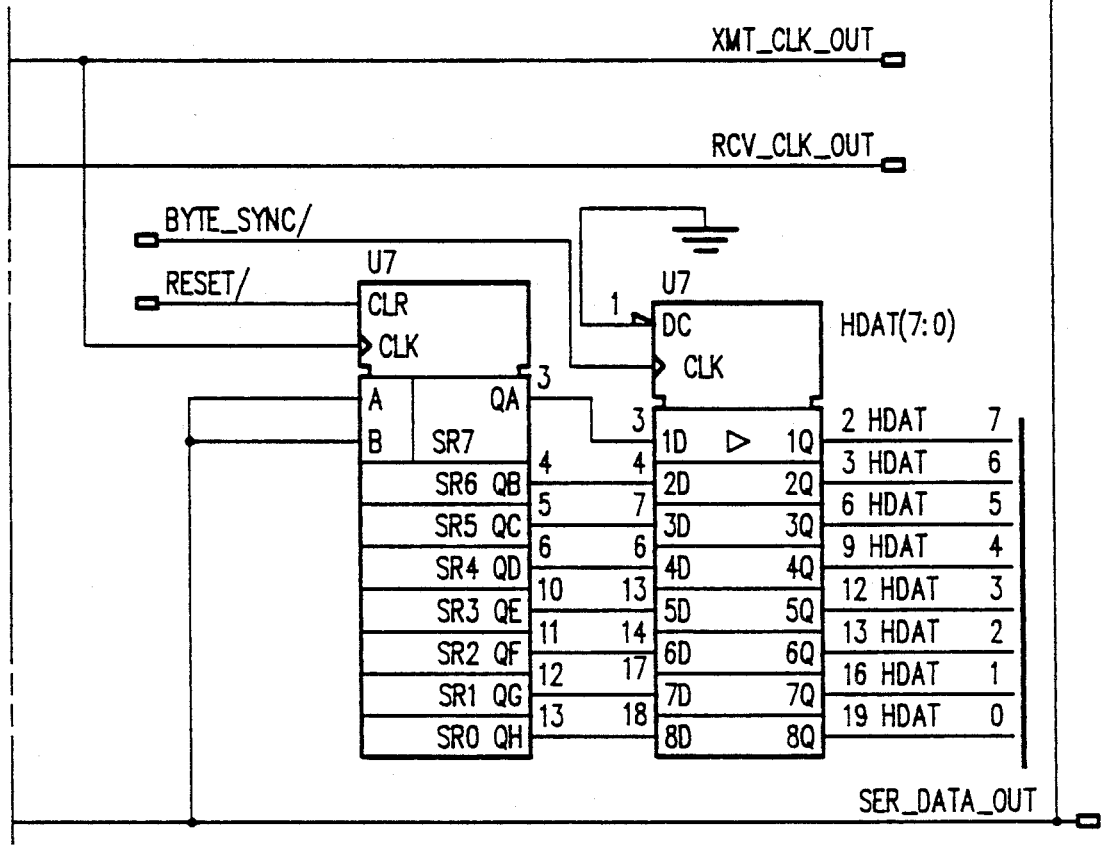

Referring to FIG. 5, there is shown the various portions of the components of the receive control circuit 14 of the apparatus 10 of the present invention. Data from the second digital link 139, from the switch 140, is supplied to a protocol comparison unit 80 as well as a phase control unit 82. The output of the phase control unit 82 is supplied to a switch 84. The output of the protocol comparison unit 80 is also supplied to the switch 84. The microprocessor 52, previously discussed, controls the protocol comparison unit 80 as well as switch 84. The output of the switch unit 84 is supplied to the host via the data link 122.

In the operation of the receive control circuit 14 or 114, we shall assume that there are N channels, each having an associated FIFO 66 (a–n). The collection of FIFO's 66 (a–n) can be a single RAM memory operating as a virtual N FIFO's. The data from each of the channels is supplied, through its FIFO 66, to the switch 40 or 140. The switch 40 or 140, when in the receiving mode, acts like when it is in the transmission mode. That is, the switch 40 receives a "frame" of data from each of the channels and the switch 40 sequences over each of the plurality of channels in the same order in each cycle. Thus, the digital data on the plurality of channels is reassembled into a single stream of digital data by the switch 40 and is supplied to the protocol comparison unit 80 and the phase control unit 82.

Figure 6A:
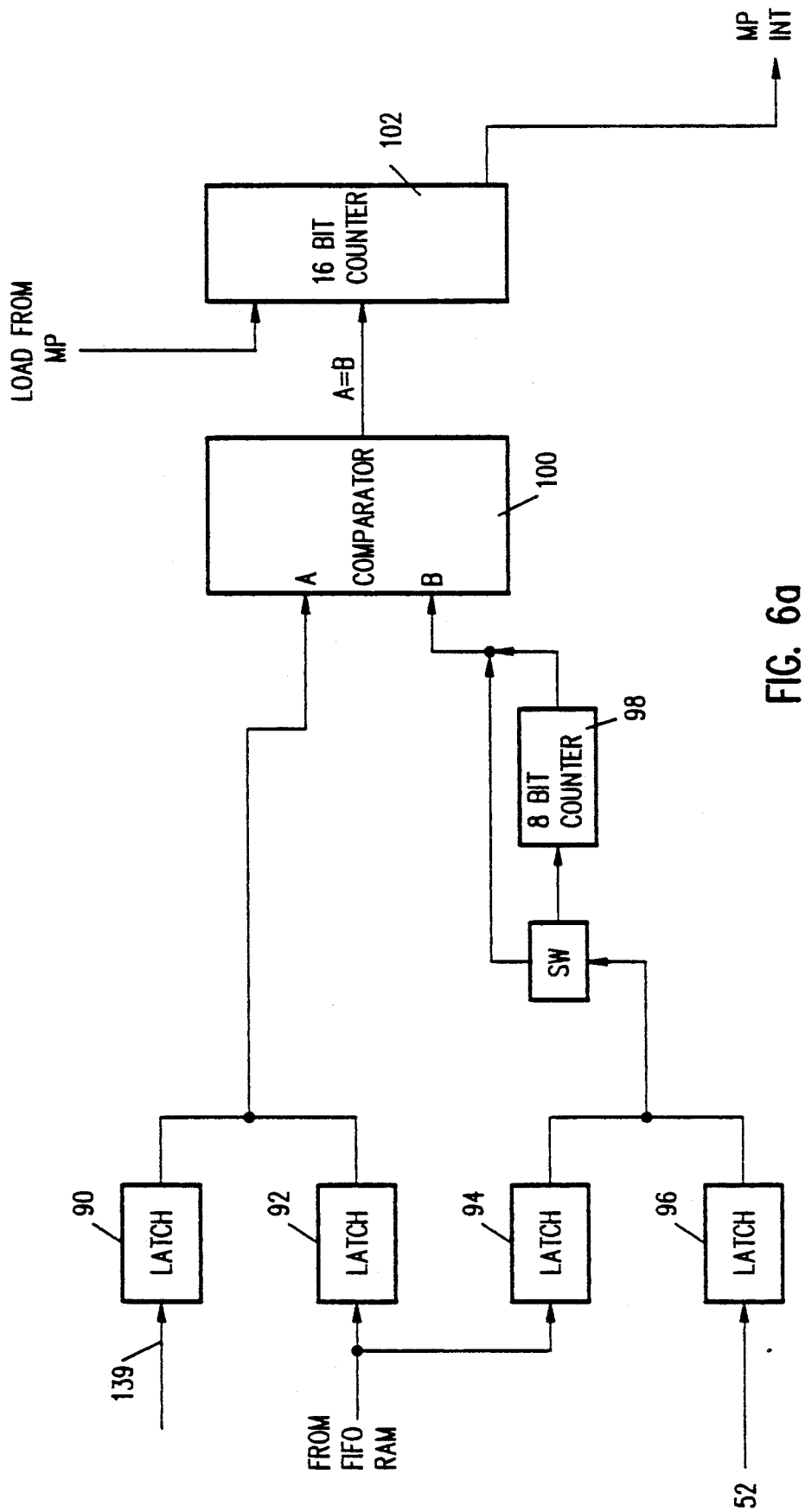
FIG. 6a is a detailed block diagram of a component of the receive control circuit shown in FIG. 5.

Referring to FIG. 6a, there is shown in greater detail the protocol comparison unit 80. The data from the second digital link 139 is supplied to a first latch 90. The data from a FIFO RAM 112 is supplied to a second latch 92. The outputs of the first and second latches 90 and 92 respectively are supplied to a comparator 100. The data from the FIFO RAM 112 is also supplied to a third latch 94. The microprocessor 52 loads the data into the fourth latch 96. The output of the third and fourth latches, 94 and 96 can be supplied to the comparator 100. In addition, data from the fourth latch 96 can be supplied to an 8 bit counter 98. The output of the 8 bit counter 98 is also supplied to the comparator 100. In the event the inputs to the comparator 100 are the same, the output is supplied to a 16 bit counter 102 which is used to load the data from the microprocessor 52. The output of the 16 bit counter 102 supplies a microprocessor interrupt to the microprocessor 52.

Figure 7A:
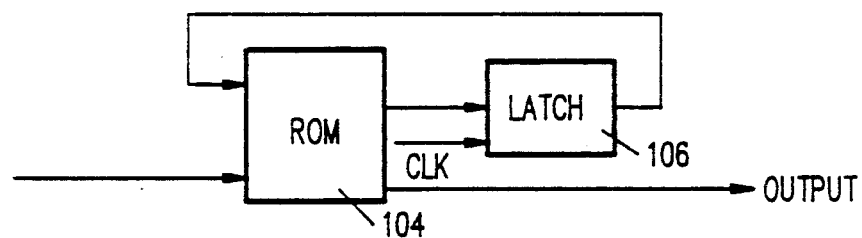
FIG. 7a is a detailed block diagram of a portion of the receive control circuit shown in FIG. 5.

Referring to FIG. 7a there is shown a ROM 104 which receives input from the signals A, B, B__ EQ__MAX, and FRAME__SYNC. The output of the ROM is supplied to a latch 106 which also receives a clock signal. The output latch 106 is supplied back to the input of the ROM 104. The ROM 104 is a state machine, which is well known in the art. A listing of the software contained in the ROM 104 is attached herewith as Exhibit A. The output of the ROM 104 are CLR__CTR__A (which is used to clear Counter A), CLR__CTR__B (which is used to clear counter B), LATCH__BMAX (which is used to latch the output of Counter B into latch 126), and MAP__FIFO (which is used to stop the filling of the MAP RAM 110, and then to fill the FIFO RAM 112.

Figure 8A:
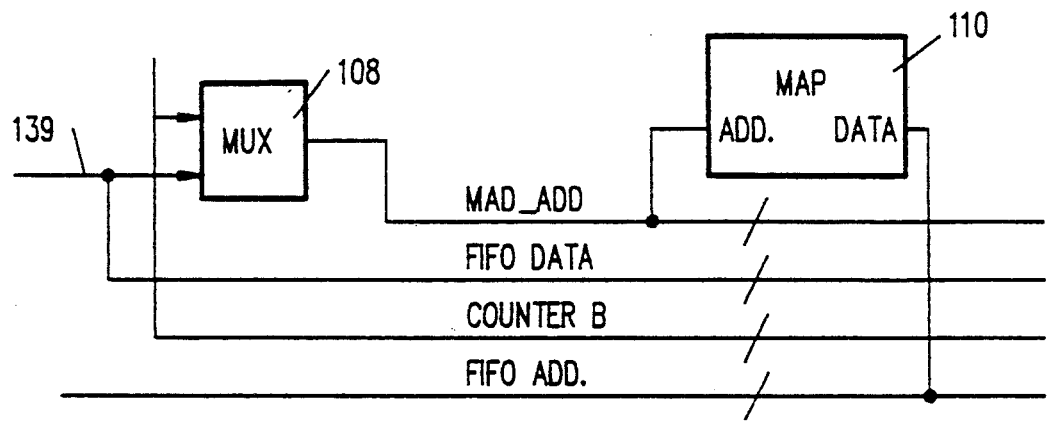
FIGS. 8a, 9a and 10a are detailed block diagrams of the phase control circuit portion of the receive control circuit shown in FIG. 5.
Figure 9A:
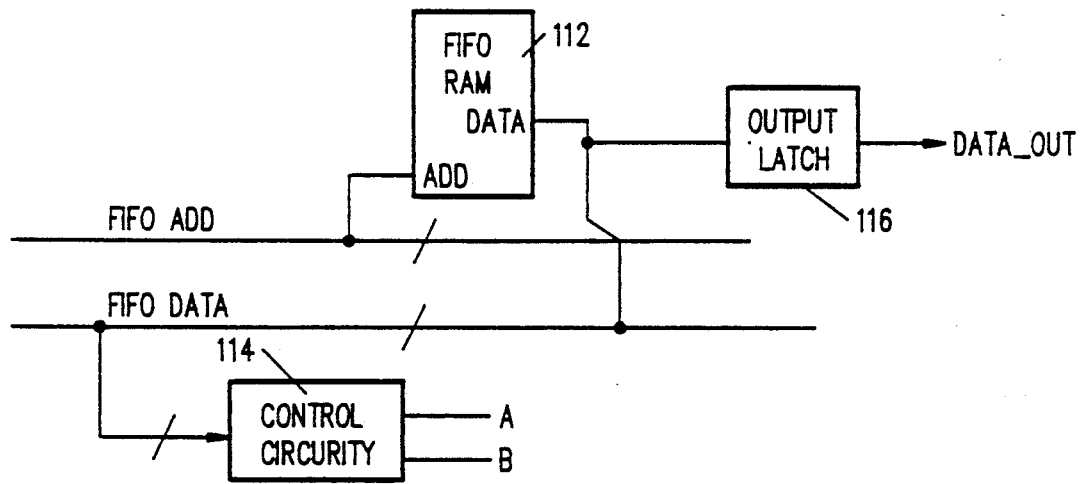
Figure 10A:
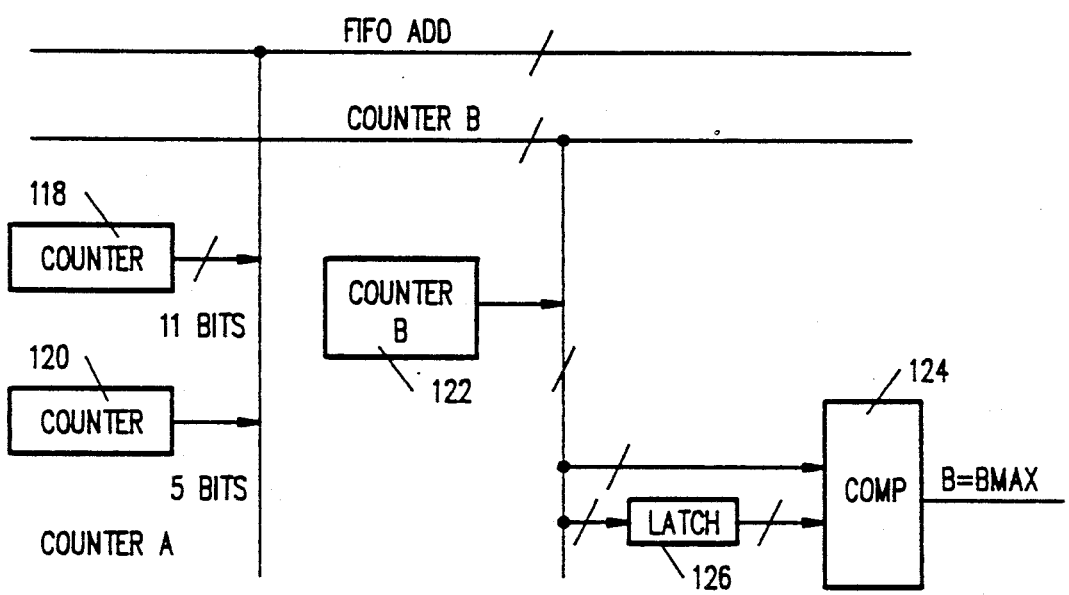
Figure 9B:
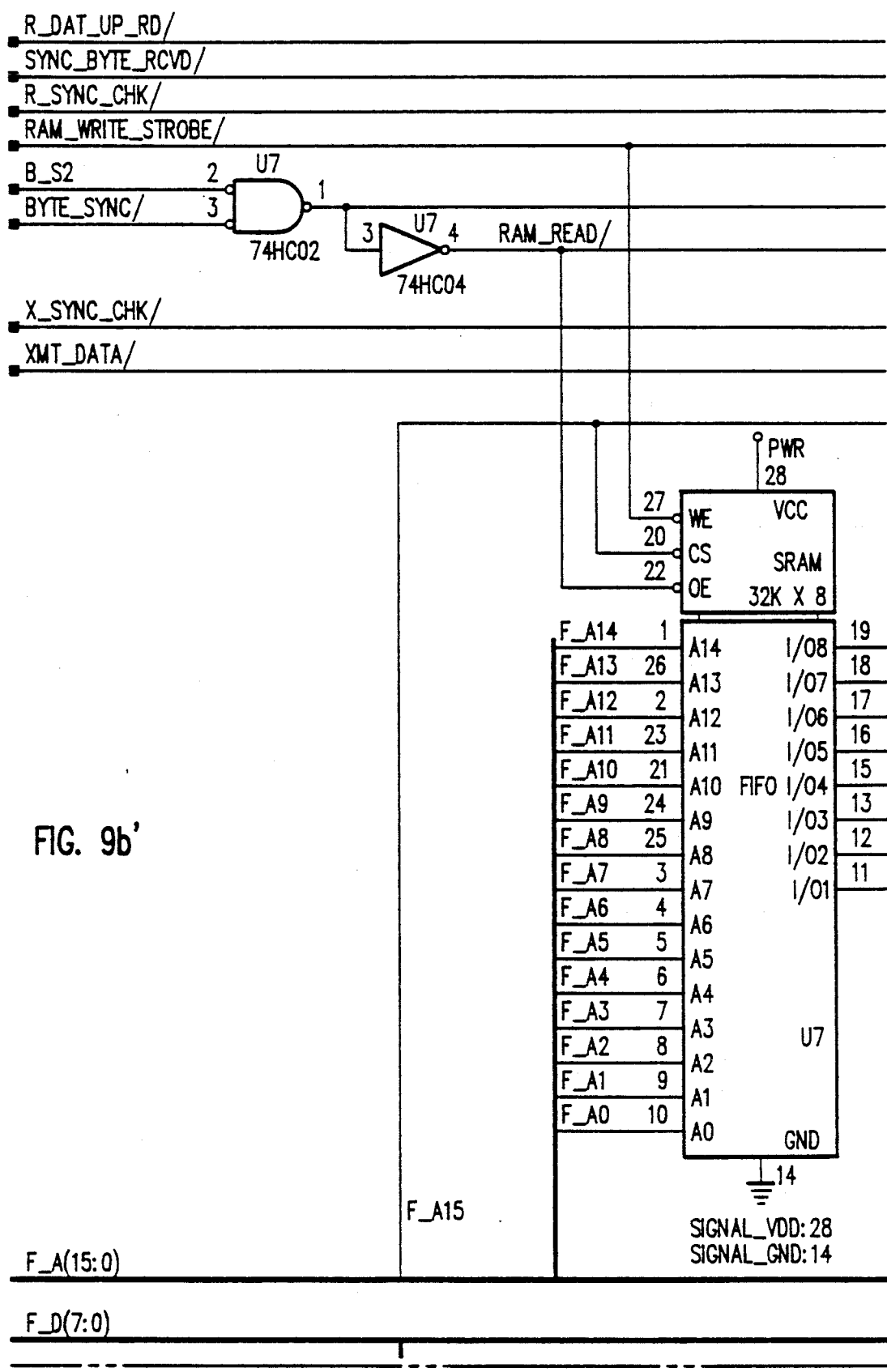
Figure 9B:
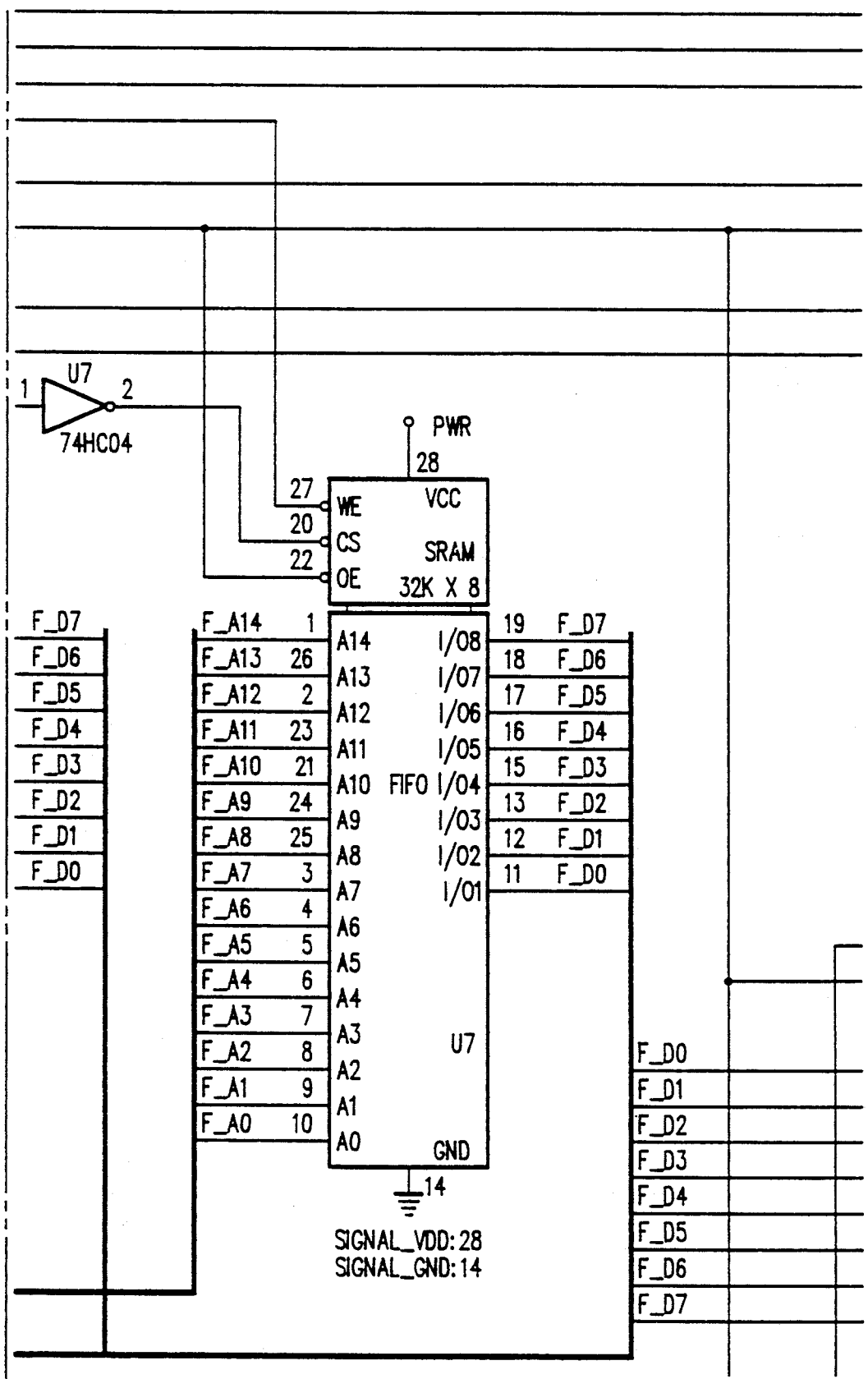
Figure 10B:
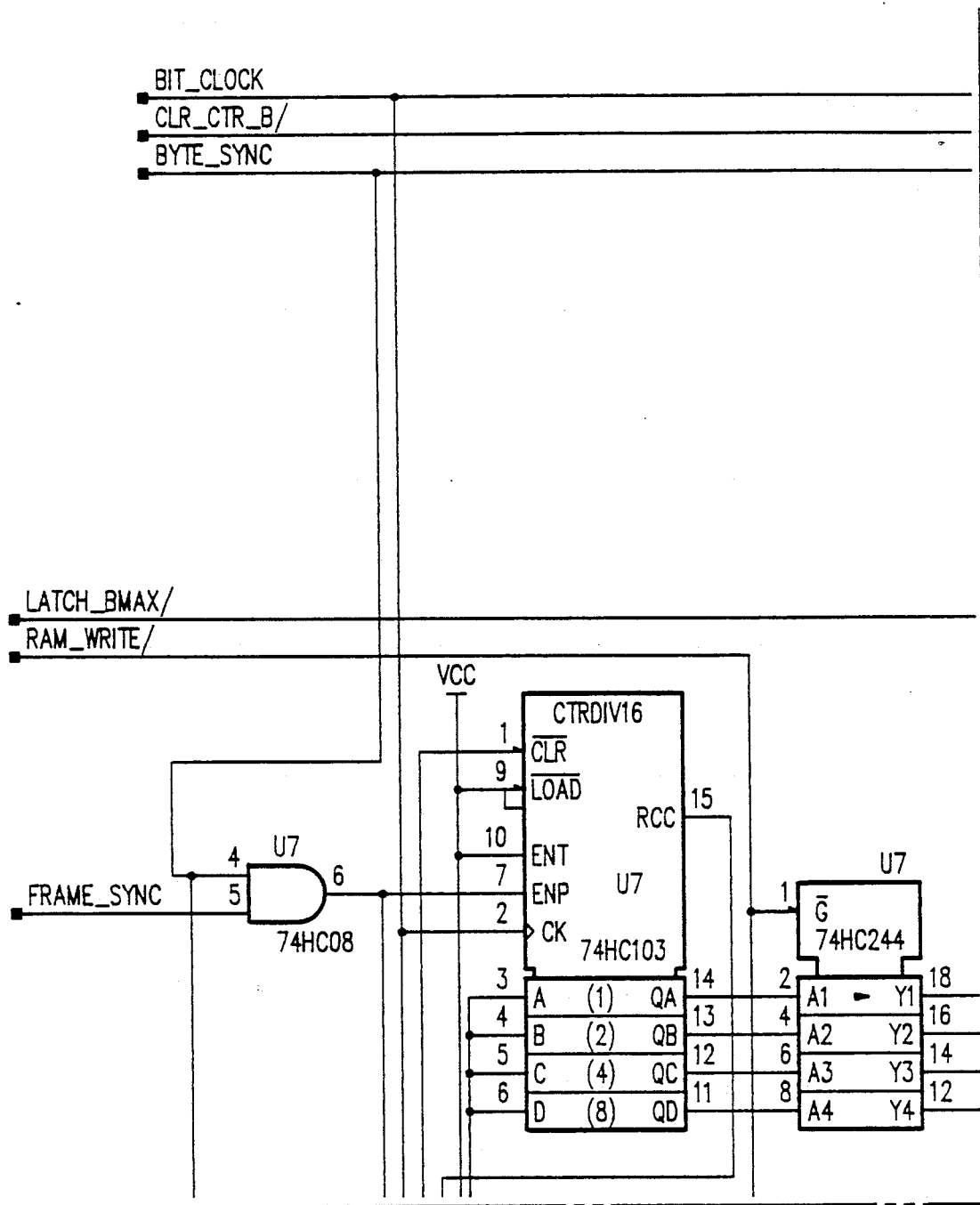
Figure 10B:
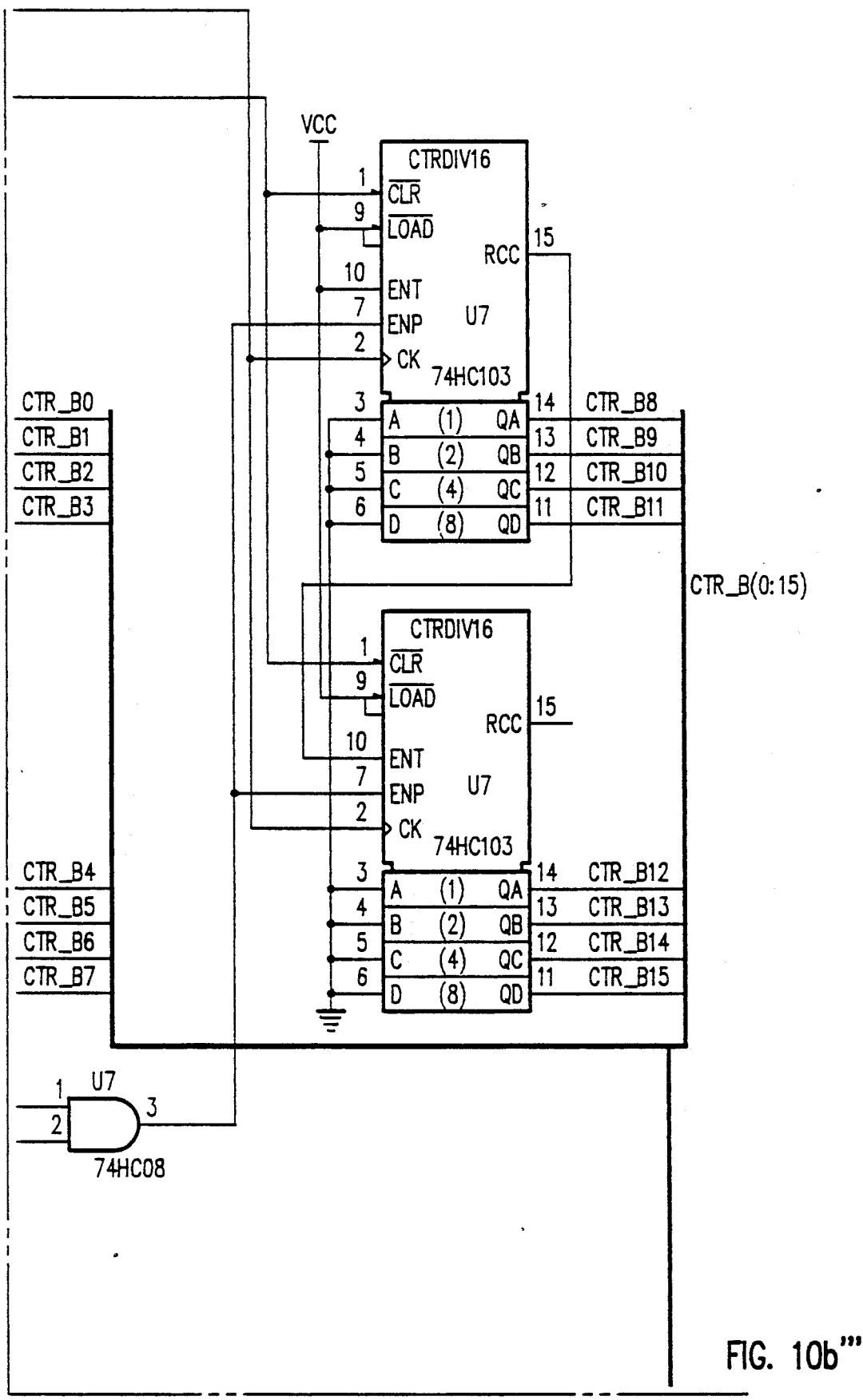

Referring to FIGS. 8a, 9a and 10a, there is shown the various portions of the phase control circuit 82. Data from the second digit link 139 is supplied to the multiplexer 108. In addition, it is also supplied along the FIFO DATA bus, which is supplied to the data input of the FIFO RAM 112. The output of the multiplexer 108 is supplied as the address to the MAP RAM 110.

Counter 118 and 120 collectively form a counter A. Counter 118 cycles through 11 bits. Counter 120 cycles through 5 bits. Together they are concatenated and form 16 bits which is supplied along he FIFO ADD bus and is supplied as the address to the FIFO RAM 112. In addition, the output of counter A is supplied along the FIFO ADD bus as the data to the MAP RAM 110.

Counter B 122 is a 16 bit counter and is supplied to the counter B bus which is also supplied to the multiplexer 108 and to the comparator 124. Counter B 122 is also supplied to a latch 126 which is also supplied to the comparator 124.

The operation of the various components of the apparatus 10 of the present invention will now be described. Initially, the apparatus 10 and 110 each begins to send to the other a byte NCH1, indicating the number of channels to be used. Upon receipt from the other of the end of (1*N) consecutive NCH1's, which agrees with the transmitted number, each of the apparatuses 10 and 110 transmits a minimum of (3*D*N) bytes of NCH2. NCH2 is NCH1 with bit 6 set to 1.

Upon receipt of (1*N) NCH2 and completion of sending (3*D*N) NCH2 in response thereto, each apparatus 10 and 110 send to the other ISP1 (request for synchronization). The transmission of NCH1 insures that both ends agree on the number of channels to be used during the connection. If the number of channels to be used to not agree, then each of the apparatuses 10 and 110, must take appropriate action, including but not limited to notifying the user, or reinitiating the B channel calls.

In the transmission phase of ISP1, each side transmits to the other (1*N) consecutive ISP1's. Upon receipt, it responds by transmitting a minimum of (3*D*N) ISP2.

In the preferred embodiment, the ISP1 signal has a value of hexadecimal "C0". This is accomplished by the microprocessor 52, supplying the signal ISP1 to the shift register 70. The output of the shift register 70 is looped back into its input. The multiplexer MUX 72 is set to receive the output of the shift register. The output of the multiplexer 72 is then supplied to the network. Thus, the shift register 70 will continually loop and generate the ISP1 signal.

Figure 6B:
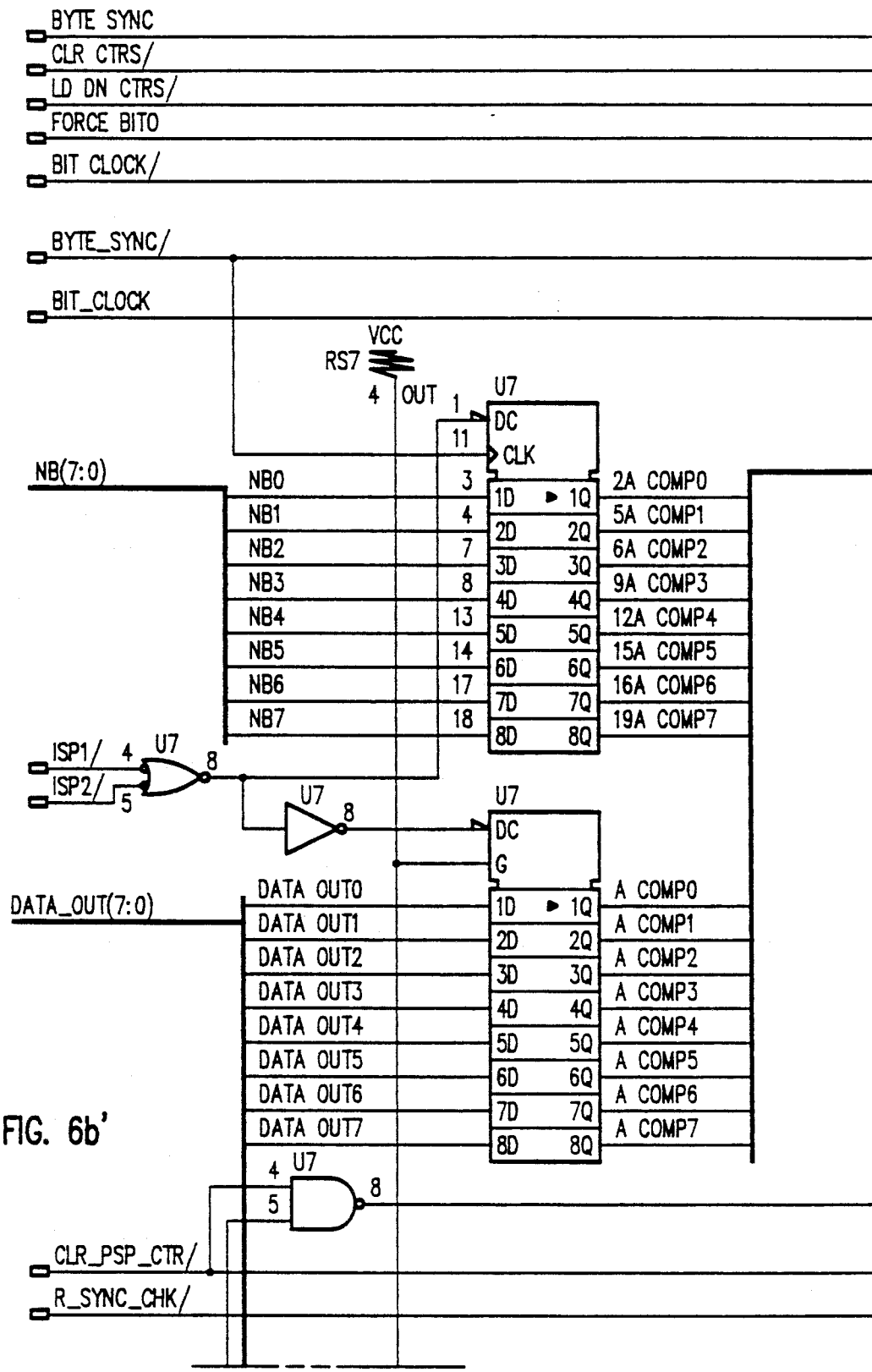
Figure 6B:
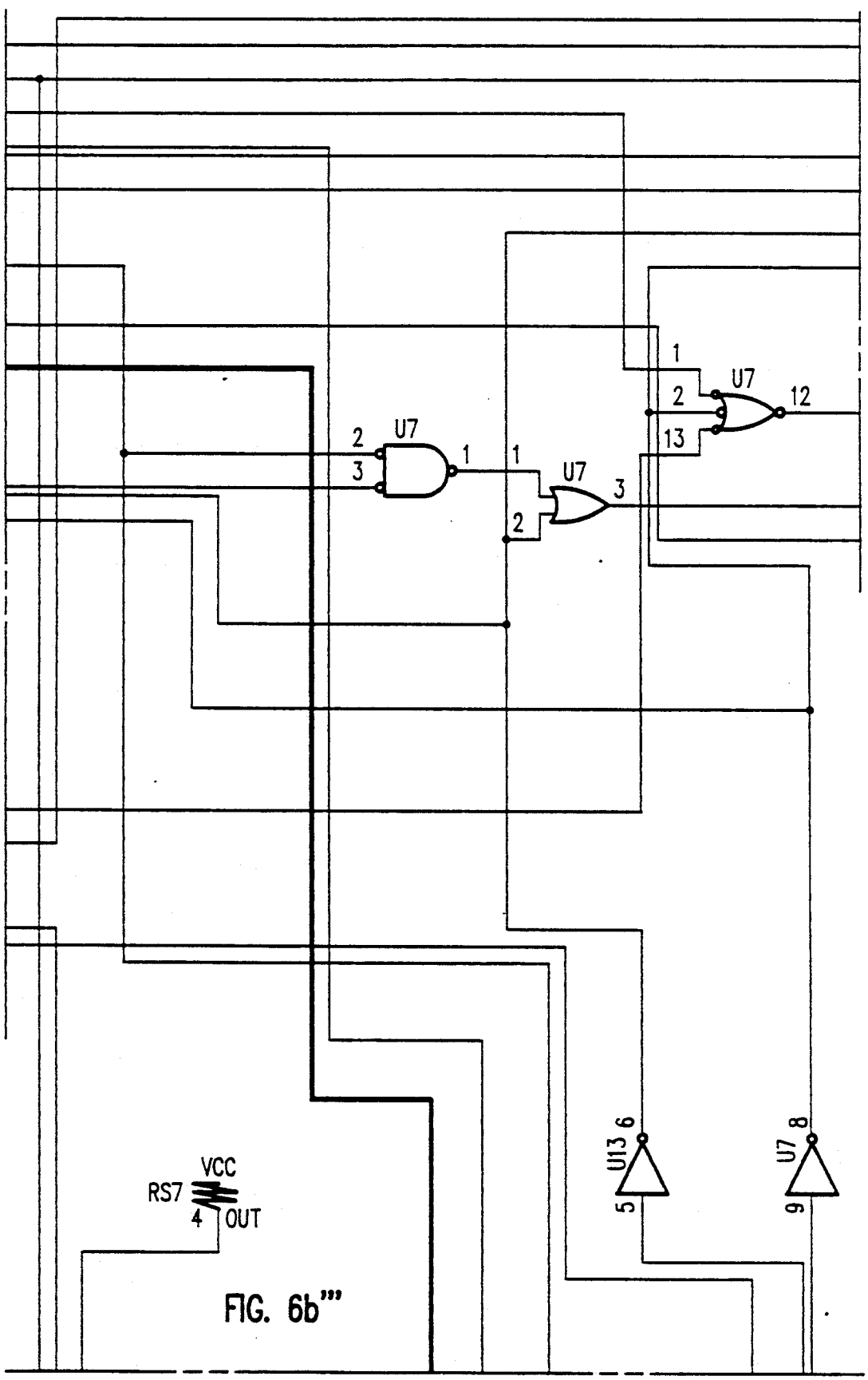
Figure 6B:
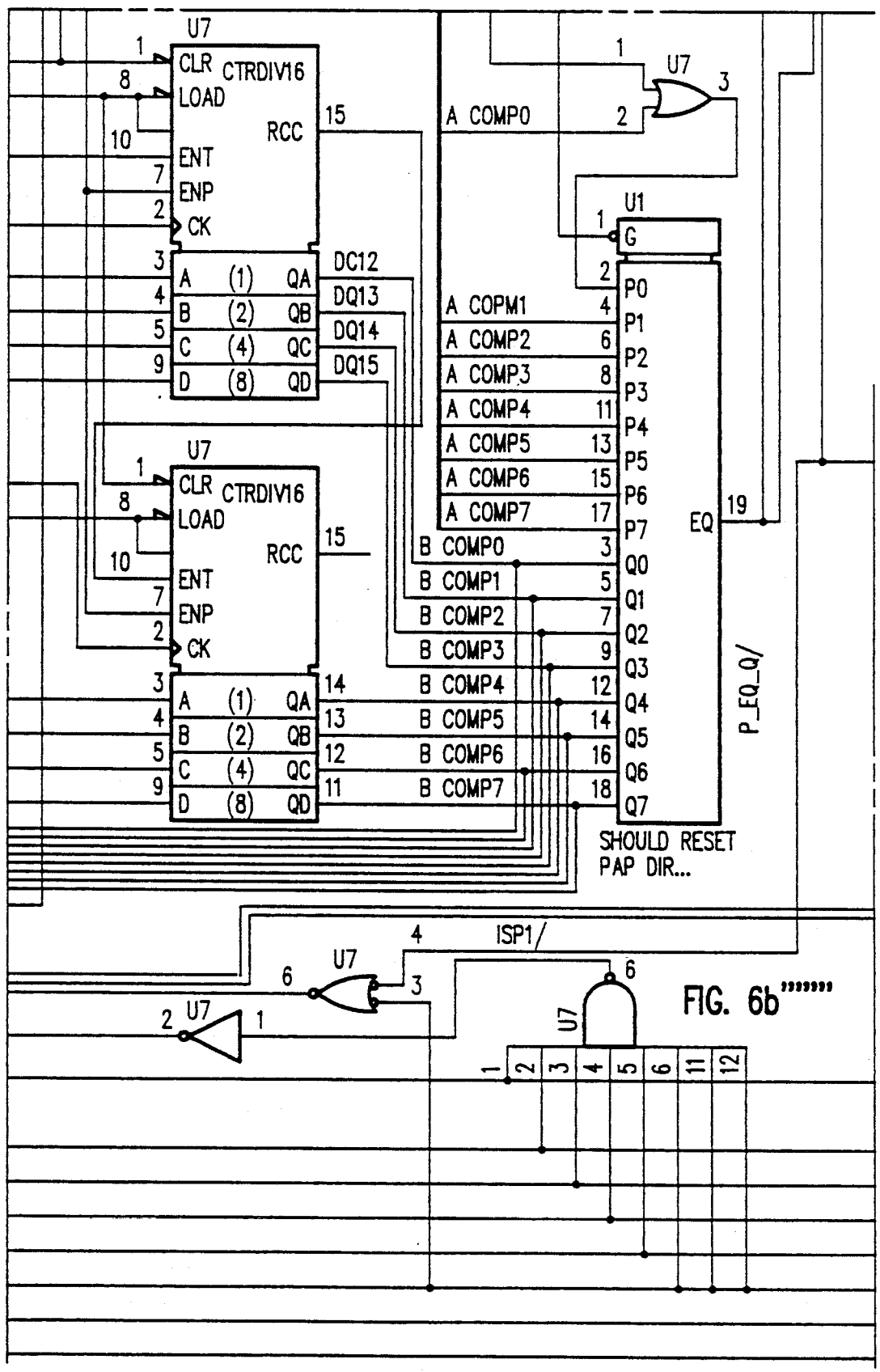

The ISP1 signal is received from the network via second digital link 139 and is supplied to the protocol comparison unit 80 and in particular is loaded into the first latch 90. The microprocessor 52 in the receiving apparatus 110 loads the expected value of ISP1 into the fourth latch 96. The output of the first latch 90 and the output of the fourth latch 96 are supplied through the comparator 100 (in this mode, the 8 bit counter 98 is bypassed, see FIG. 6b wherein the signal from the output in the latch 96 bypasses the counter 98). In the event the signals are equal, the comparator 100 would generate its output which is used to load the 16 bit counter 102. The 16 bit counter 102 is loaded with the number (3*D*N) from the microprocessors 52. The counter would then count down and upon reaching zero, would generate the microprocessor interrupt. The number loaded into the counter 102 from the microprocessor 52 indicates the number of ISP1 bytes that is expected in the initial phase.

Thereafter, each apparatuses 10 and 110 will transmit to the other the data ISP2. In the preferred embodiment, the ISP2 has a hexadecimal value "41". Similarly, to the foregoing discussion, the transmission of ISP2 is accomplished by the microprocessor 52 loading ISP2 into the shift register 70. Thereafter, the output of the shift register 70 is looped back and is continuously transmitted. A minimum of (3*D*N) ISP2 is transmitted.

At the receiving unit, the signal from the network is then latched into the first latch 90. The microprocessor 52 loads into the fourth latch 96 the expected value of ISP2. The first latch 90 and the fourth latch 96 are then compared by the comparator 100. In the event the comparisons are equal, the output of the comparator 100 is used to load the value (3*D*N) from the microprocessor into the 16 bit counter 102. The 16 bit counter 102 would count down and would reach zero if (1*D*N) consecutive number of bytes of ISP2 are received. When the counter 102 reaches zero, it generates a microprocessor interrupt. The receiving unit responds by transmitting a minimum of (3*D*N) ISP2's. In this manner, the channels of the network are flooded with ISP2's and the protocol exchange phase is completed.

During the transmission and reception of ISP2, the data received on the FIFO DATA bus is supplied to the control circuitry 114. The outputs of the control circuitry A and B can have the following values:

| A | B | |
|---|---|---|
| 0 | 1 | all ISP2's received |
| 1 | 0 | no ISP2 received |
| 1 | 1 | some ISP2's received |
| 0 | 0 | Invalid condition |

A and B are supplied to the ROM 104. Based upon the inputs of A and B, the ROM 104 responds as follows:

| A | B | Response of ROM 104 |
|---|---|---|
| 0 | 1 | don't start the counters |
| 1 | 0 | end the counters |
| 1 | 1 | start the counters |

Between the conditions (1,1) and (1,0) is the maximum relative delay of the channels of the network.

Upon completion of the protocol exchange phase, the apparatus 10 and 110 enter into a phase synchronization phase. Each apparatus 10 and 110 begins to transmit to the other a signal which is a synchronization pattern, which is a cyclical repetition of a sequential order of hexadecimal values, excluding ISP2. Thus, the apparatus 10, upon receipt of ISP2 would send the following hexadecimal values: 00, 01, ... 40, 42, 43, ... 7F, 00, . ... Each of the apparatus 10 and 110 uses this synchronization pattern received from the other to rearrange the phase relationship of the data received from the plurality of channels to correct for the delay therein. The apparatus 10 and 110 transmits (2*(N*(3*D+5))) number of synchronizing bytes, and checks to see if at least N*(D+2) bytes are received.

The transmission of the signals is a follows: The output of the 8 bit counter 74 is supplied to the shift register 76 which is supplied to the MUX 72 and is sent to the network. Since the 8 bit counter continuously and cyclical repeats, the data send out would be a cyclical repetitive pattern. However, when the bit pattern from the 8 bit counter 74 equals ISP2, the comparator 75 generates an output which is supplied as an input to the 8 bit counter 74 causing it to "jump", thereby skipping ISP2.

In the receive control section 114, the data from the network (28–38) along the second digital link 139 is supplied to the FIFO DATA bus. In addition, the data from the FIFO DATA bus is supplied to the output latch 116 and is supplied then to the second latch 92. The microprocessor 52 loads the fourth latch 96 and activates the 8 bit counter 98. The output of the 8 bit counter 98 is then compared to the output of the second latch 92 by the comparator 100. In the event the two signals are equal, the comparator 100 generates an output which causes the data from the microprocessor 52 to be loaded into the 16 bit counter 102. Upon the 16 bit counter 102 counting down to zero, it generates a microprocessor interrupt.

During the synchronization phase period, the phase difference caused by the delay in each of the different channels is compensated. This is accomplished in the following manner.

Initially, the data from the network is supplied over the second digital data link 139 to the multiplexer 108 which is then supplied as an address to the MAP RAM 110. The counter A comprising of counters 118 and 120 generates a counted data which is supplied on the FIFO ADD bus. The data on the FIFO ADD bus is loaded into the MAP RAM 110 in the address specified by the data from the second digital link 139. The counter 118, comprising of lower 11 bits, is incremented with each frame, i.e., the counter 118 is incremented upon the receipt of a frame of data from each channel. The upper 5 bits from the counter 120 are incremented with each channel enable (i.e. as each new channel is enabled).

When the output MAP_FIFO from ROM 104 goes high, the data from the second digital link 139 is supplied along the FIFO DATA bus and is loaded into the FIFO RAM 112. This occurs after 2*N*D bytes are received. Thereafter, the output of the counter 122 is supplied along the counter B bus to the MUX 108 and is supplied as the address to the MAP 110. The data stored in the MAP RAM 110 at the address specified from the counter B 122 is outputted onto the FIFO ADD bus and is used to store the data on the FIFO DATA bus into the FIFO RAM 112. The output of the FIFO RAM 112 is continually monitored. When the output of the FIFO RAM 112 is the expected data sequence, then the loading of the FIFO RAM 112 is terminated. Counter B provides a sequential count reaching a maximum value of D*N where D and N is the maximum delay in the network (28–38) and N is the number of channels. Data from the FIFO RAM 112, based upon the address from the data output of the MAP RAM 110 is then read out. The sequence of data from the FIFO RAM 112 read out in this matter will be in correct phase relationship and will be the reconstituted single data stream.

Once the phase synchronization phase is over, the acknowledgement phase begins. In the acknowledgement phase, each of the apparatus 10 and 110 sends to the other (3*D*N) ACK1 signals (which in the preferred embodiment has the hexadecimal value of "D0"). If at least (D*N) ACK1 signals are not received within an expected time frame, then the entire initialization phrase is restarted.

After the apparatus 10 or 110 has received the appropriate number of ACK1 bytes, then the apparatus sends a minimum of (3*D*N) ACK2 signals (which is hexadecimal "51") while looking for at least (D*N) ACK2 bytes from the other unit. This is accomplished by the microprocessor 52 loading into the shift register 70. At the receiving end, data from the FIFO RAM 112 is loaded into second latch 92 and is compared to the data loaded into fourth latch 96 from the microprocessor 52. These are compared by the comparator 100. The output of the comparator 100 loads the value from the microprocessor 52 into the 16 bit counter 102 which counts down to zero and generates a microprocessor interrupt when a correct number of bytes are received. This is used during the ACK1 and the ACK2 and the XFR1 phase.

After receiving at least (D*N) ACK2 bytes and after sending a minimum of (3*D*N) ACK2 bytes, each of the apparatuses sends (N) XFR1 (hexadecimal value "75") and looks for (N) XFR1 bytes. Once XFR1 is transmitted and received, the transmission of data can begin.

During the transmission of the data, after every 499th byte, the apparatus 10 and 110 transmits a SYNC byte in each of the channel at a different frame. The SYNC byte is a synchronization byte and is a 7 bit incrementing value. Thus, initially, the SYNC byte in the first channel would have a hexadecimal value of "00" with "01" transmitted in the second channel, etc.

Each of the receiving units looks for the SYNC bytes every 499th byte of data in each channel. In the event the SYNC signal is not received, it indicates a network problem. Since if any channel is out of phase, then the reconstructed data stream is entirely corrupt. Thus, upon the detection of error by the comparator 100, the entire initialization sequence must be reestablished.

To insure the transmission of the SYNC byte does not affect the clock speed, the data from the host 20 is clocked into the FIFO 60 at the rate of 99.8%*56K*N. The FIFO 60 is 256 bits deep. The transmission of the data over the network (28-38) is at the rate of 56K*N. Since an extra SYNC byte occurs once every 499 bytes, the rate is increased by 1/500 or 0.2%. Once the data from the network (28-38) is clocked into the shift register 63 at the receiving unit, it is clocked out to the receiving host 120 at the rate of 99.8%*56K*N. Thus, to the host units 20 and 120 at both ends, the clock rate remains the same. Of course, 56K is just one example of the data ate that can be used. Other data rates include 64K, and others.

The SYNC byte is a 7 bit incrementing value which is used for synchronization. The SYNC byte is generated N times. Thereafter, during the time that the SYNC byte would have been generated, interprocessor commands are transmitted and received. The interprocessor commands are transmitted and received for N bytes. After that, the SYNC bytes are once again used for synchronization purpose.

One of the commands which can be issued by the apparatus 10 or 110 of the present invention is for the other apparatus to change the bandwidth of the communication session. Since communication is accomplished by time multiplexing over a plurality of channels, changing the bandwidth of the communication session is accomplished by increasing or decreasing the number of channels. Thus, if the host 20 sends a request to the apparatus 10 of the present invention through the command link 24 of its desire to change the rate of communication, the apparatus 10 responds by waiting for the appropriate moment in the SYNC cycle to send an interprocessor command to the other unit change the number of channels. Once a response is received from the other unit that it is ready to change the number of channels during the communication session, the apparatus 10 sends a response through the command link 24 to the host 20 of its readiness to change the rate of communication.

The host 20 then temporarily stops supplying data to the apparatus 10. When the last frame of data from the host 10 is transmitted to the other apparatus 110, the apparatus 10 will then reinitialize the communication by sending ISP1 (request for synchronization) over the changed number of channels. Once the initialization has been accomplished for the changed number of channels, the apparatus 10 issues a command to the host 20 over the command link 24 informing it that the communication has now been established over a changed number of channels. The host can then supply data to the apparatus 10 at the changed rate.

In the preferred embodiment, the processor 52 is an 80186 processor made by Intel Corporation.

Figure 11:
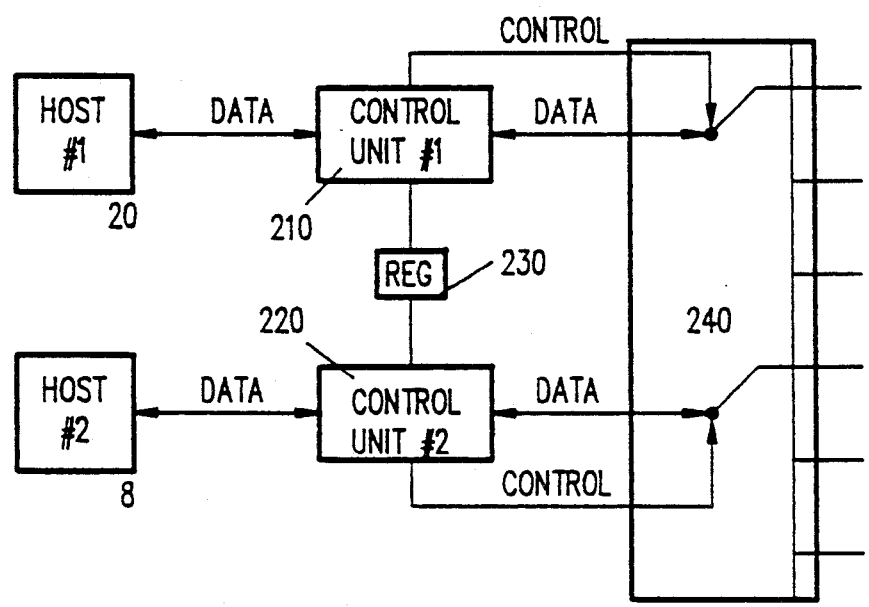
FIG. 11 is another embodiment of the apparatus of the present invention useful for transmitting and receiving digital streams from multiple sources and having the capability of setting the priorities for each of the streams of digital data.
Figure 7B:
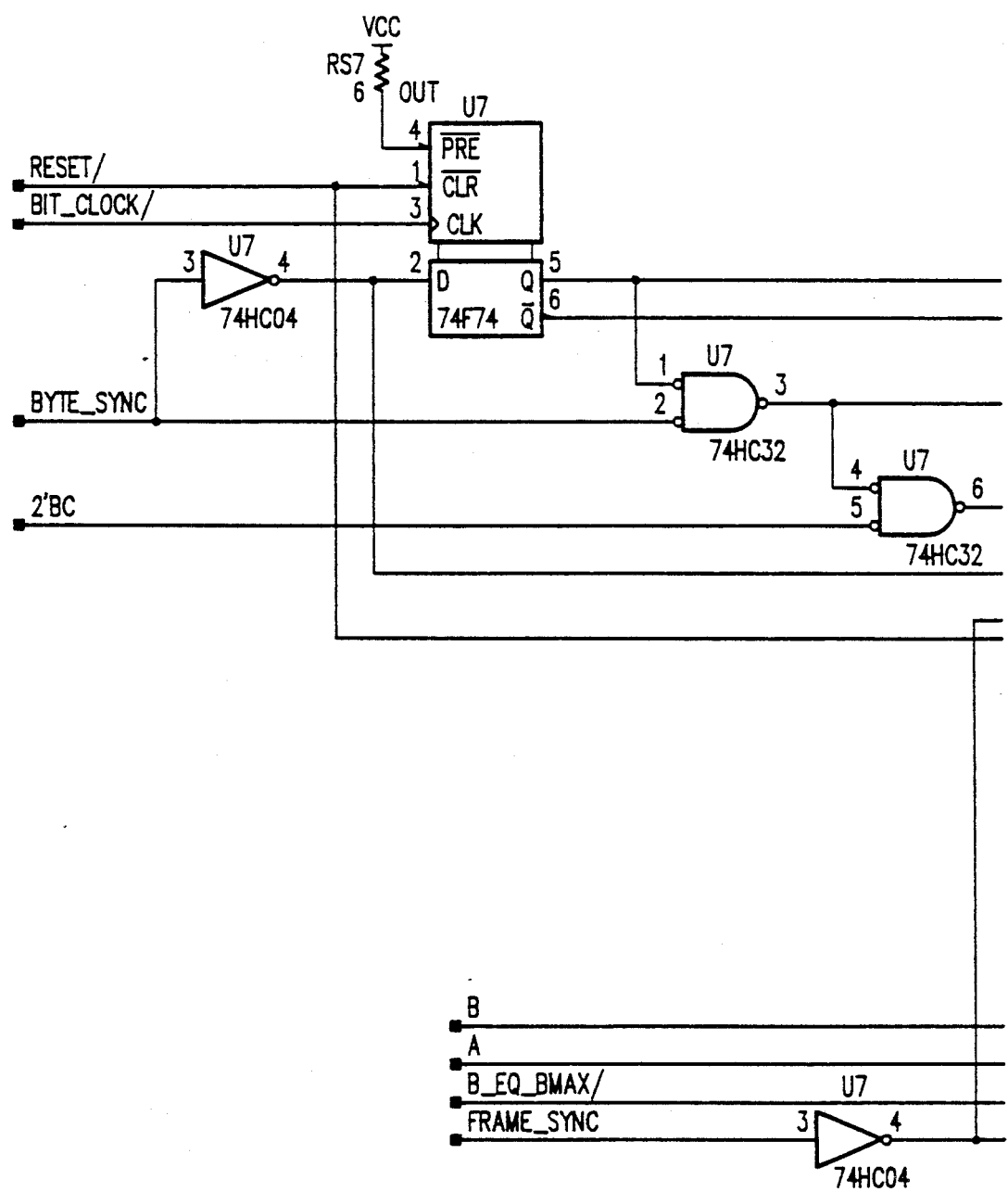
Figure 7B:
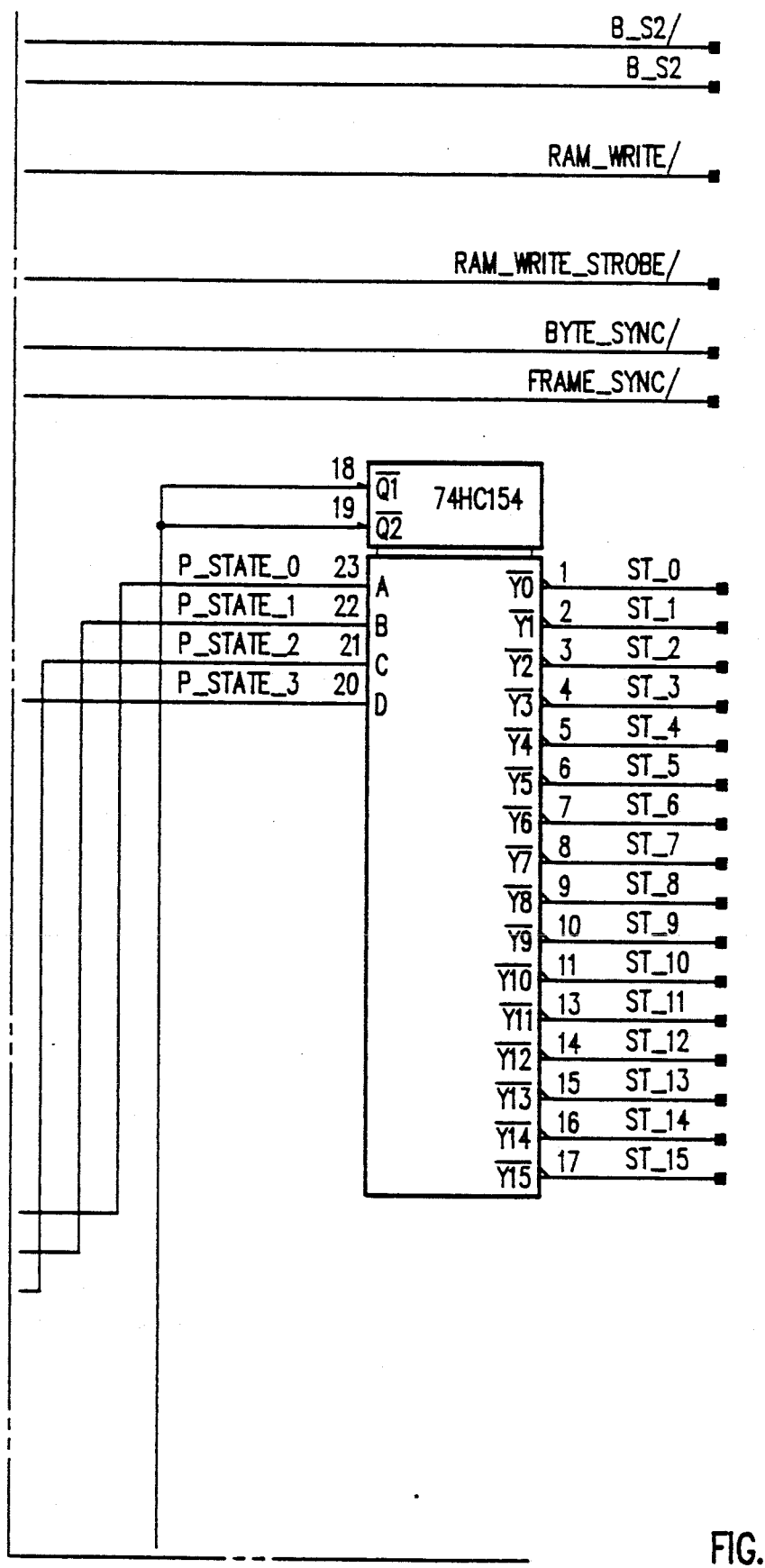
Figure 8B:
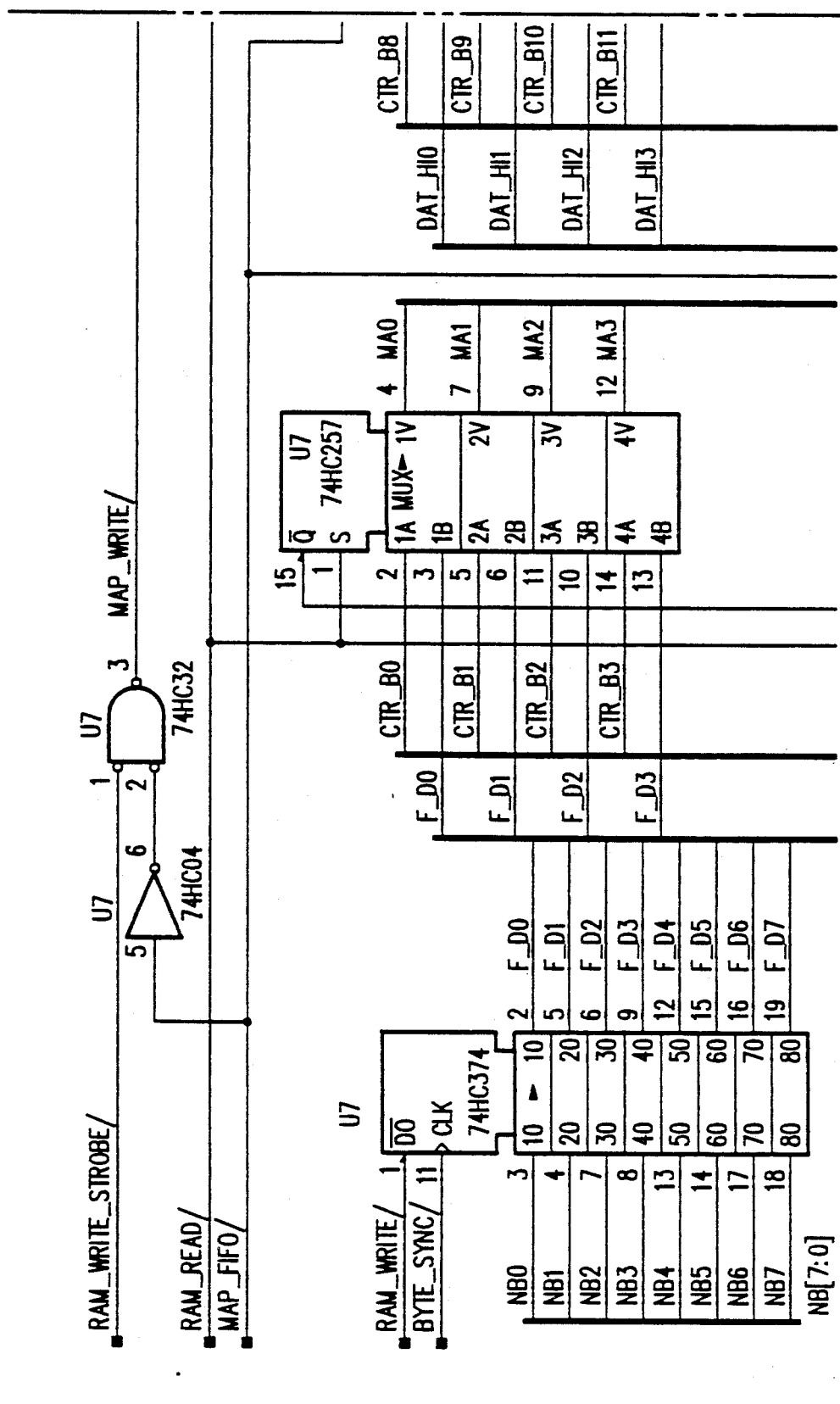
FIGS. 8b, 9b and 10b are detailed circuit diagrams of the detailed block diagram shown in FIGS. 8a, 9a and 10a, respectively.
Figure 8B:
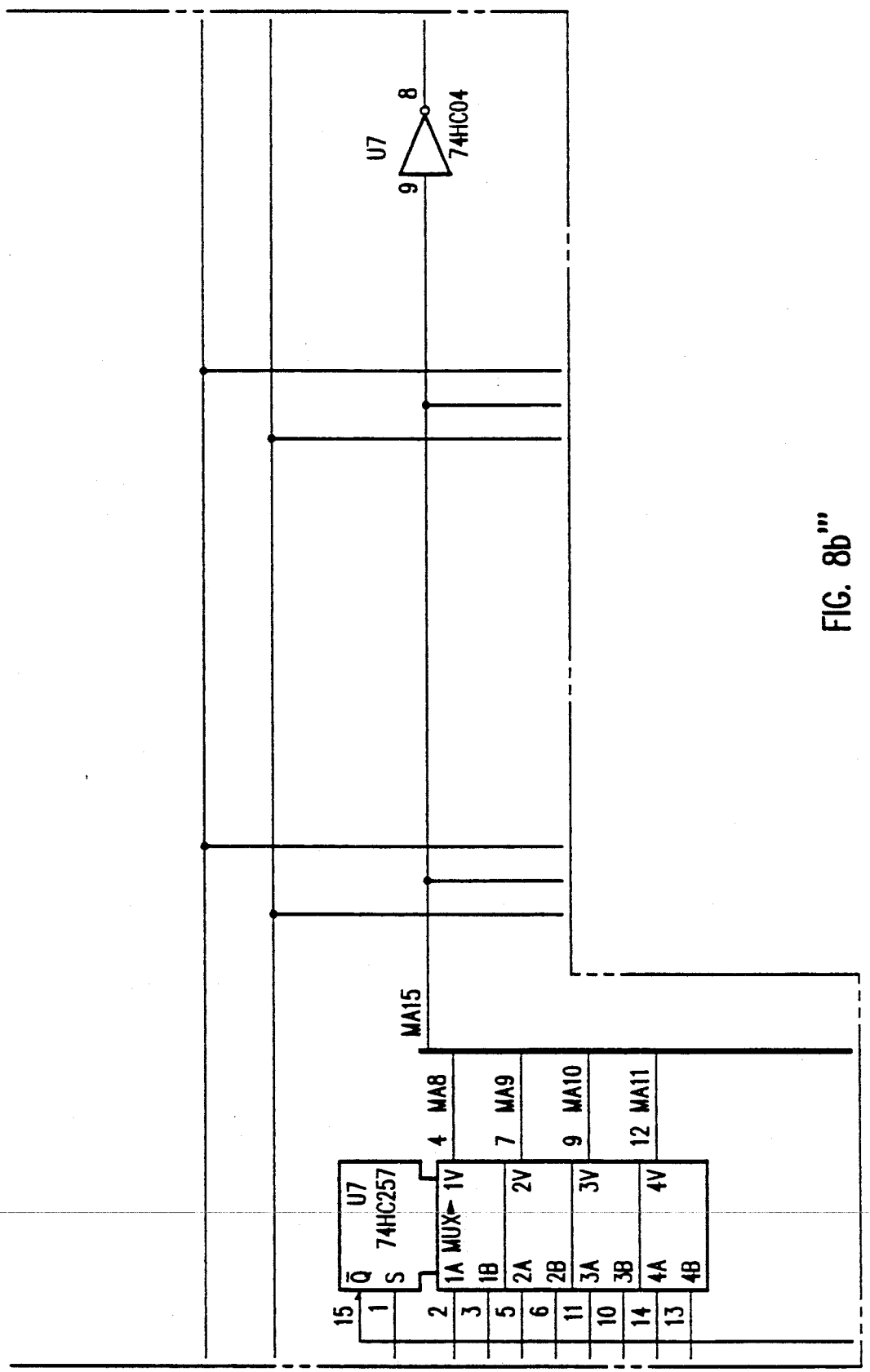

Referring to FIG. 11, there is shown another embodiment of the apparatus 10 of the present invention useful for transmitting and receiving digital streams from multiple sources. As shown in FIG. 11, there are two like apparatus 10, designated as control unit number one communicating with a host number one, and a control unit number two communicating with a host number two. The like control unit number one and control unit number two communicate with each other through a register 230.

Each of the control units control a switch 240 and 240' respectively. Each of the switches 240 and 240' are connected to a plurality of channels. The number of channels to which each of the switches 240 and 240' respectively can be connected in any communication session is determined by the contents of the register 230. Thus, as shown in FIG. 11, there are a total of 6 channels. Each of the switches 240 and 240' can connects its respective control unit to all of the 6 channels (with the other control unit's switch not connected to any of the channels), or a portion of the channels with the other switch connected to the remaining portion of the 6 channels. In this manner, while one control unit may distribute digital data cyclically over some of the channels, the other control unit will distribute digital data cyclically over the remaining channels.

By having the control units communicate with one another through the register 230, the utilization of the total number of channels can be based upon a priority system. Thus, if host number one were using three of the channels and host number two were using the other three channels and host number one wanted to transmit its data more quickly, it would request that the control unit number one through register 230, access 4 or more of the channels and accordingly with the control unit number two relinquishing those channels for use by the control unit number one. Thus, the control units can accommodate the priority of the data from the host units and can access the number of channels accordingly.

As can be seen from the foregoing, the apparatus 10 of the present invention has many advantages. First and foremost is that the bandwidth of any communication session can be dynamically changed during the communication session. In addition, with the unique phase and ordering circuitry, the apparatus 10 of the present invention eliminates an adjustable shift register in each of the channels. Finally, by providing for circuitry to detect the ratio of the flags to non-flags as an indication of utilization of each channel, the apparatus 10 can greatly determine the productivity of each of the channels.

What is claimed is:

1. In a digital data communication system for transmitting and receiving a single digital data stream between a first unit at a first location and a substantially like second unit at a second location, separated by a plurality of channels, wherein said first unit has means for receiving the single digital data stream, means for transmitting said single digital data stream by cyclically distributing the single digital data stream along the plurality of channels in the same order in each cycle, with each of said plurality of channels subject to different delays, and wherein said second unit has means for receiving the data from each of said channels, means for reconstituting the data received from said plurality of channels into the transmitted single digital data stream, wherein said reconstituting means further comprising:

means for cyclically recombining the plurality of said data streams, in the same order in each cycle, into a single receiving data stream, but without regard to the order of the initial cycle of recombination;

a first counter means for cyclically generating a first counter output signal;

a first memory means having a plurality of storage locations, address input, data input, and data output;

means for supplying said single receiving data stream to the address input of said first memory means;

means for supplying said first counter output signal to the data input of said first memory means for storage therein;

a second counter means for generating a second counter output signal;

a second memory means having a plurality of storage locations, address input, data input and data output;

means for supplying said first counter output signal to the address input of said second memory means;

means for supplying the single receiving data stream to the data input of said second memory means for storage therein;

means for supplying said second counter output signal to the address input of said first memory means; and means for supplying the data from said first memory means along its data output to the address input of said second memory means with the data from the data output of the second memory means being the output of said apparatus in the same order as the data of the single transmitting data stream.

2. In a digital data transmission apparatus for receiving a plurality of distributed digital data streams, each stream preceded by synchronizing data, received along a plurality of channels with each of said plurality of channels subject to different delays and with each data stream received from a single channel, said plurality of digital data streams being supplied from a single transmitting data stream cyclically distributed in the same order in each cycle along said plurality of channels, said apparatus comprising:

means for cyclically recombining the plurality of said data streams, in the same order in each cycle, into a single receiving data stream, but without regard to the order of the initial cycle of recombination, said single receiving data stream initially having the synchronizing data;

a first counter means for cyclically generating a first counter output signal;

a first memory means having a plurality of storage locations, address input, data input, and data output;

means for supplying said synchronizing data to the address input of said first memory means;

means for supplying said first counter output signal to the data input of said first memory means for storage therein;

a second counter means for generating a second counter output signal;

a second memory means having a plurality of storage locations, address input, data input and data output;

means for supplying said first counter output signal to the address input of said second memory means;

means for supplying the single receiving data stream to the data input of said second memory means for storage therein;

means for supplying said second counter output signal to the address input of said first memory means; and means for supplying the data from said first memory means along its data output to the address input of said second memory means with the data from the data output of the second memory means being the output of said apparatus in the same order as the data of the single transmitting data stream.

3. In a digital data transmission apparatus for receiving a plurality of distributed digital data streams, each stream preceded by synchronizing data, received along a plurality of channels with each of said plurality of channels subject to different delays and with each data stream received from a single channel, said plurality of digital data streams being supplied from a single transmitting data stream cyclically distributed in the same order in each cycle along said plurality of channels, said apparatus comprising:

means for cyclically recombining the plurality of said data streams, in the same order in each cycle, into a single receiving data stream, but without regard to the order of the initial cycle of recombination, said single receiving data stream initially having the synchronizing data;

a first counter means for cyclically generating a first counter output signal, said first counter output signal having a frame portion, which counts sequentially up to the total number of channels, and a byte portion, which counts sequentially up to the maximum number of data units of said delay, and is reset by each count in the frame portion;

a first memory means having a plurality of storage locations, address input, data input, and data output;

means for supplying said synchronizing data to the address input of said first memory means;

means for supplying said first counter output signal to the data input of said first memory means for storage therein;

a second counter means for generating a sequential second counter output signal;

a second memory means having a plurality of storage locations, address input, data input and data output;

means for supplying said first counter output signal to the address input of said second memory means;

means for supplying the receiving data stream to the data input of said second memory means for storage therein;

means for supplying said second counter output signal to the address input of said first memory means; and means for supplying the data from said first memory means along its data output to the address input of said second memory means with the data from the data output of the second memory means being the output of said apparatus in the same order as the data of the single transmitting data stream.

4. The apparatus of claim 3 wherein said first counter means is a counter.

5. The apparatus of claim 4 wherein said second counter means is a counter.

6. A method for generating a digital data stream received from a plurality of distributed digital data streams, each of said plurality of distributed streams preceded by synchronizing data, received along a plurality of channels with each of said plurality of channels subject to different delays and with each data stream received from a single channel, said plurality of digital data streams being supplied from a single transmitting data stream cyclically distributed in the same order in each cycle along said plurality of channels, said method comprising:

cyclically recombining the plurality of said data streams, in the same order in each cycle, into a single receiving data stream, but without regard to the order of the initial cycle of recombination, said single receiving data stream initially having the synchronizing data;

cyclically generating a first counter output signal, said first counter output signal having a frame portion which counts sequentially up to the total number of channels, and a byte portion, which counts sequentially up to the maximum number of data units of said delay, and is reset by each count in the frame portion;

supplying said synchronizing data to the address input of a first memory means;

supplying said first counter output signal to the data input of said first memory means for storage in the addresses specified by the synchronizing data;

generating a sequential second counter output signal;

supplying said first counter output signal to the address input of a second memory means;

supplying the receiving data stream to the data input of said second memory means for storage in the addresses specified by the first counter output signal;

supplying said second counter output signal to the address input of said first memory means to output the data from said first memory means along its data output;

supplying the data output from the first memory means to the address input of said second memory means; and outputting the data from the second memory means from the addresses specified by the data output from the first memory means;

wherein the output of the data from the second memory means is in the same order as the data of the single transmitting data stream.

7. In a digital data communication system for transmitting and receiving a single digital data stream between a first unit at a first location and a substantially like second unit at a second location, separated by a plurality of channels, wherein each unit has means for receiving the single digital data stream, and means for cyclically distributing the single digital data stream along the plurality of channels in the same order in each cycle, with each of said plurality of channels subject to different delays, wherein the improvement to each unit comprising:

means for cyclically recombining the plurality of said data streams, in the same order in each cycle, into a single receiving data stream, but without regard to the order of the initial cycle of recombination;

a first counter means for cyclically generating a first counter output signal;

a first memory means having a plurality of storage locations, address input, data input, and data output;

means for supplying said receiving data stream to the address input of said first memory means;

means for supplying said first counter output signal to the data input of said first memory means for storage therein;

a second counter means for generating a second counter output signal;

a second memory means having a plurality of storage locations, address input, data input and data output;

means for supplying said first counter output signal to the address input of said second memory means;

means for supplying the receiving data stream to the data input of said second memory means for storage therein;

means for supplying said second counter output signal to the address input of said first memory means; and means for supplying the data from said first memory means along its data output to the address input of said second memory means with the data from the data output of the second memory means being the output of said apparatus in the same order as the data of the single transmitting data stream.

* * * * *